US007017043B1

(12) United States Patent
Potkonjak

(10) Patent No.: US 7,017,043 B1
(45) Date of Patent: Mar. 21, 2006

(54) METHODS AND SYSTEMS FOR THE IDENTIFICATION OF CIRCUITS AND CIRCUIT DESIGNS

(75) Inventor: Miodrag Potkonjak, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/528,522

(22) Filed: Mar. 20, 2000

Related U.S. Application Data

(60) Provisional application No. 60/125,286, filed on Mar. 19, 1999, provisional application No. 60/125,275, filed on Mar. 19, 1999, provisional application No. 60/129,135, filed on Apr. 13, 1999.

(51) Int. Cl.
*H04L 9/00* (2006.01)
*G06F 9/45* (2006.01)
(52) U.S. Cl. .................. 713/176; 713/181; 726/32; 716/10
(58) Field of Classification Search ................ 713/176, 713/181; 382/145; 716/1, 4, 5
See application file for complete search history.

(56) References Cited

U.S. PATENT DOCUMENTS

| | | | | |
|---|---|---|---|---|
| 4,703,435 A | * | 10/1987 | Darringer et al. ............. | 716/18 |
| 6,070,258 A | * | 5/2000 | Asaka ........................ | 714/724 |
| 6,161,213 A | * | 12/2000 | Lofstrom ..................... | 716/4 |
| 6,519,743 B1 | * | 2/2003 | Nauts et al. .................. | 716/3 |
| 6,625,780 B1 | * | 9/2003 | Charbon et al. .............. | 716/1 |

OTHER PUBLICATIONS

Hong, Inki et al. "Techniques for intellectual property protection of DSP designs", 1998, IEEE, pp. 3133-3136.*
Kahng, Andrew B. et al. "Robust IP Watermarking Methodologies for Physical Design", 1998, ACM, pp. 782-787.*
Kahng, A. B. et al. "Watermarking Techniques for Intellectual Property Protection", 1998, ACM, pp. 776-781.*
Kirovski, Darko et al. "Intellectual property protection by watermarking combinational logic synthesis solutions", 1998, ACM, pp. 194-198.*
Kirovski, Darko et al. "Intellectual Property Protection Using Watermarking Partial Scan Chains for Sequential Logic Test Generation", Nov. 1998.*
Lach, John et al. "Signature Hiding Techniques for FPGA Intellectual Property Protection", 1998, ACM, pp. 186-189.*
Lach, John et al. "FPGA fingerprinting techniques for protecting intellectual property", 1998, IEEE, pp. 13.5.1-13.5.4.*
Schneier, Bruce. Applied Cryptography, Second Edition, 1996 by John Wiley & Sons, Inc., pp. 30-31.*

(Continued)

*Primary Examiner*—Gregory Morse
*Assistant Examiner*—Michael J. Simitoski
(74) *Attorney, Agent, or Firm*—Knobbe, Martens, Olson & Bear LLP

(57) ABSTRACT

The present invention is related to systems and methods for adding a signature to circuit design. In one embodiment, a first set of constraints used to specify a functional portion of the circuit design is received. A second set of constraints used to specify the signature is received as well. The circuit design is generated based on at least the first constraints and the second constraints, wherein the signature is embedded in the functional portion.

7 Claims, 23 Drawing Sheets

OTHER PUBLICATIONS

Entrena, Luis et al. "Sequential Logic Optimization By Redundancy Addition and Removal", 1993 IEEE.*

Golson, Steve. "State Machine Design Techniques for Verilog and VHDL", 1994.*

Scott, Ken et al. "Improving Cell Libraries for Synthesis", 1994 IEEE.*

Sentovich, Ellen M. et al. "SIS: A System for Sequential Circuit Synthesis", May 1992.*

Edoardo Charbon, "Hierarchical Watermarking in IC Design", 1998, Cadence Design Systems Inc.

Swanson, et al. "Object-Based Transparent Video Watermarking", Electronic Proceedings of IEEE Signal Processing Society, 1997 Workshop On Multimedia Signal Processing, pp. 369-374.

Charbon, et al. "Watermarking Layout Topologies", Cadence Design Systems, Inc., 1999 IEEE, pp. 213-216.

Hartung, et al. "Watermarking of Uncompressed and Compressed Video", Telecommunications Institute I, University of Erlangen-Nuremberg, Germany, vol. 66, No. 3, May 1998, pp. 283-301.

Torunoglu, et al. "Watermarking-Based Copyright Protection of Sequential Functions", IEEE Journal of Solid-State Circuits, vol. 35, No. 3, Feb. 2000.

Charbon, et al., "On Intellectual Property Protection" Invited Paper, Cadence Design Systems Inc., IEEE 2000 Custom Integrated Circuits Conference, pp. 517-523.

Swanson, et al., "Data Hiding for Video-in-Video", 1997 IEEE, pp. 676-679.

Boney, et al., "Digital Watermarks for Audio Signals", Proceedings of Multimedia '96, 1996 IEEE, pp. 473-480.

Yeung, et al., "Digital Watermarking for High-quality Imaging", IEEE First Workshop on Multimedia Signal Processing, 1997 IEEE, pp. 357-362.

Mintzer, et al. "If One Watermark is Good, Are More Better?", Proceedings of the International Conference on Acoustics, Speech, and Signal Processing, 1999 IEEE, vol. 14, pp. 2067-2069.

Cox, et al., "Secure Spread Spectrum Watermarking for Multimedia", IEEE Transactions on Image Processing, 1997 IEEE, Dec. 1997, vol. 6, No. 12, pp. 1673-1687.

Berghel, et al., "Protecting ownership rights through digital watermarking", Internet Kiosk, Jul. 1996, pp. 101-103.

Mintzer, et al., "Effective and Ineffective Digital Watermarks", IEEE Proc., IEEE Conference on Image Processing, ICIP-97, Oct. 1997, vol. 3, pp. 9-12.

Arlindo L. Oliveria, "Robust Techniques For Watermarking Sequential Circuit Designs", 1999 ACM, pp. 837-842.

* cited by examiner

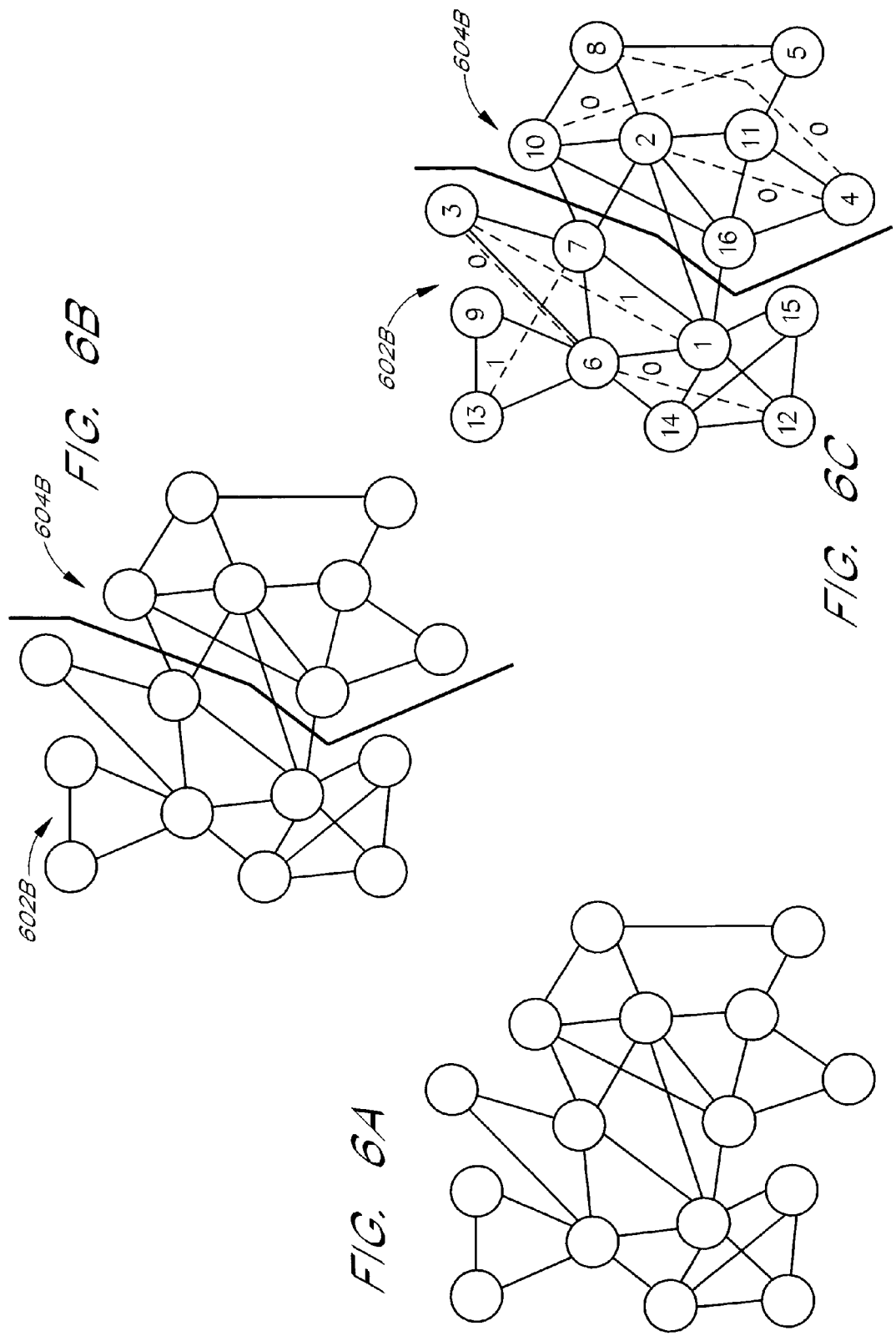

METHODS AND SYSTEMS FOR THE IDENTIFICATION OF CIRCUITS AND CIRCUIT DESIGNS

The present application claims priority from U.S. Provisional Patent Application No. 60/125,286, filed on Mar. 19, 1999, U.S. Provisional Patent Application No. 60/125,275, filed on Mar. 19, 1999, and U.S. Provisional Patent Application No. 60/129,135, filed on Apr. 13, 1999. The contents of these applications, in their entirety, is hereby incorporated by reference.

BACKGROUND OF THE INVENTION

1. Field of the Invention

The present invention relates to methods and systems for the identification of circuits and circuit designs, and in particular, to placing identifiers in circuits and circuit designs.

2. Description of the Related Art

Intellectual property is playing an increasingly important role in the development and economy of modern societies. By way of example, intellectual property includes such essential areas as software, hardware, circuit designs, biotechnology, and media, such as television, cinema, music, books, and magazines. The increase in importance of intellectual property has been met with corresponding efforts to misappropriate, counterfeit, or steal intellectual property. Intellectual property in the form of digital data, such as music stored on CDs or software code, has been a particularly attractive target as perfect or near perfect copies of the original material may be made by thieves or counterfeiters.

With regard to circuit designs, intellectual property in the form of reusable cores (macro blocks for complex integrated circuits) has recently emerged as one of the most important components in the design process. The enormous growth of both circuit applications and implementation technologies has outpaced the design productivity of conventional design synthesis processes. Thus, the reuse of sophisticated and complex cores and software is needed to meet the demands of future developments, such as ultra large-scale integration. The trend towards the development and standardization of reusable cores is evidenced by the creation of the Virtual Socket Initiative Alliance™ which is directed to the development of an architecture for the reuse of functional circuit design blocks. One example of a functional block, that may be designed by one company and licensed or sold for use in products from other companies, is a signal processing core. Such a core may be used in a modem, a disk controller, a cellular device, and so on. Thus, the companies using the licensed core are spared the time, cost, and risk of developing their own signal processor circuit design.

However, in order to encourage the use of such reusable cores it is important to ensure that the core designs are not stolen or improperly distributed. Currently, it is often difficult to determine if a device is utilizing a stolen design. Thus, it is often difficult and expensive for an intellectual property owner to protect his or her rights.

SUMMARY OF THE INVENTION

The present invention is generally related to protecting intellectual property, such as circuit designs, software, databases, multimedia, system architectures, chemical compositions, drugs, algorithms, gene sequences, and the like. Protection may be offered via a signature or watermark embedded in the intellectual property. The signature may be digital or analog in nature.

In one embodiment, a specification, including one or more constraints, is provided for the functional portion of the intellectual property, such as a circuit design. The identifier is embedded in the design by adding, or superimposing, corresponding additional constraints to the design specification, thereby producing a modified specification. The resulting design will thus include the identifier, while also being capable of performing the specified function. Thus, in one embodiment, the resulting design satisfies both the original functional design specification, and the modified specification.

For example, in one embodiment, an identifier, signature, or message is advantageously embedded in a circuit design. In another embodiment, the signature is distributed over at least a portion of the circuit design using functional portions of the circuit design.

The identifier may be used to identify the source or owner of the design. In addition, the identifier may be used to identify an authorized recipient of the design. In one embodiment, the identifier is difficult to detect. In another embodiment, the identifier is difficult to modify. In yet another embodiment, the identifier is difficult to erase. In still another embodiment, the identifier is encrypted. In one embodiment, the encrypted identifier may be embedded into a circuit or circuit design. The encryption may be performed utilizing a private key. A public key may be provided and used for decryption.

In one embodiment, an identifier or signature includes error detection and correction terms. Thus, one embodiment of the present invention advantageously provides for an identifier that is difficult to detect, and even if detected, is difficult to alter. The error correction code and the signature may be embedded in a circuit design. The error correction code may be interleaved over a plurality of logic areas or blocks. Thus, if the signature is damaged as a result of an attempted deletion, the signature may still be recovered using the error correction code.

In one embodiment, the identifier is distributed over a design. Thus, in one embodiment, the embedded identifier is analogous to a digital watermark. Furthermore, in another embodiment, substantially no additional circuit hardware or logic is required to embed the identifier. In another embodiment, additional overhead may be required to embed the identifier.

As previously discussed, in one embodiment the identifier may be encrypted. For example, the encryption technique may use time stamping. In addition, in another embodiment, the identifier may include a time stamp related to one or more events.

Furthermore, the same functional design may be distributed to two or more recipients, wherein the first recipient's design has a first identifier and the second recipient's design has a second identifier different than the first identifier. Thus, the design distributed to the recipients have different "fingerprints" and therefore, if one recipient distributes the design to a third party who uses the design in a circuit, analyses of the circuit's identifier will indicate which recipient provided the design to the third party.

In one embodiment, the design is embedded at a logic minimization phase. Thus, one embodiment of the present invention causes the logic-minimization phase to have an altered result so as to prevent or alter one more logic-level minimization occurrences. The altered logic-minimization occurrences are used to embed the identifier. This altered logic minimization may be accomplished by selectively causing one or more non-primary or internal nodes to be temporarily designated as a primary node. For example, a designer may use a first library of logic functions to enter the design using a CAD (computer-aided design) system or the like. Thus, the designer may implement a NAND function using an AND gate and an inverter. CAD logic-level minimization software may typically implement the AND gate an inverter using a NAND gate. An exemplary embodiment of the present invention may prevent such a minimization by selectively designating the output of the AND gate as a primary node.

In another embodiment of the present invention, at least a portion of the identifier is embedded during an allocation phase of the design process. For example, in one embodiment, added constraints, related to the identifier, are provided for register allocation. Thus, two or more variables having differing lifetimes may be constrained to share the same register. Or, by way of example, two or more variables having differing lifetimes may be prevented from sharing the same register. In one embodiment, the probability is very low that a random register allocation would result in the same allocation as the allocation resulting from the addition of the identifier-related constraints.

In one embodiment of the present invention, at least a portion of the identifier is embedded during a transformation phase of the design process. For example, in one embodiment, added constraints, related to the identifier, are provided for transformation during behavioral synthesis.

In another embodiment of the present invention, at least a portion of the identifier is embedded during a template-matching phase of the design process. Thus, by way of example, timing paths between two or more nodes may be selectively varied in accordance with the added constraints. In one embodiment, this process does not adversely affect the overall timing or clock cycle of the circuit design.

In one embodiment of the present invention, at least a portion of the identifier is embedded during a partitioning phase of the design process. In another embodiment, at least a portion of the identifier is embedded during a scheduling phase of the design process.

In another embodiment, two or more design phases may be used to embed one or more identifiers in a circuit design. For example, at least portions of an identifier may be embedded during two or more design phases, including two or more of the design phases discussed above. In still another embodiment, the complexity of the circuit design may be analyzed and, based at least in part on the analyses, one or more of the above phases may be selectively utilized to embed the identifier.

An identifier may also be embedded in a design specification written in a software or hardware specification language, such as Java, C, VHDL, and/or Verilog. For example, a designer can specify using such languages that a group of strategically placed "don't care" values be embedded in the design or program.

In one embodiment, a user's design and/or synthesis tools do not have to be modified to embed an identifier. Instead, pre-processing or post-processing may be performed on the circuit design respectively before or after the user utilizes his or her traditional design and/or synthesis tools. In another embodiment, the design and/or synthesis tools are modified to embed the identifier.

In one embodiment, an identifier may be distributed in only a portion of a circuit design. In another embodiment, varying amounts of the identifier may be distributed in corresponding portions of a design, where the amount is sized according to the value or complexity of the corresponding portion.

In another embodiment, an identifier or signature is added to a transfer function. By way of example, the transfer function may be that of a signal processor, a communications device, or the like.

In still another embodiment an electronic signature or other information may be embedded using at least a portion of unused circuit resources. For example, in one embodiment, a circuit design may be made up of, at least in part, logical blocks. These logical blocks may include one or more resources, such as registers, gates, and/or a lookup tables. Some, or all of these resources may not be functionally used or may be assigned "don't care" values. For example, one or more inputs or outputs of a resource, such as a multiplexer, register, or memory circuit, may not be functionally used, even though other inputs or outputs of the same resource are used. Thus, these unused inputs and/or outputs may be assigned corresponding '1' or '0' values related to the signature. The signature may be distributed over a plurality of logic blocks using the available logic block resources. In another embodiment, additional circuitry or resources may be added to embed the signature.

In one embodiment, the circuit design with a digital identifier or watermark may be provided as a logic core to a user. The logic core may be, by way of example, a processor, a communication circuit, an encoder or decoder, a networking circuit, a video circuit, an audio circuit, a control circuit, a video game circuit, or the like. Furthermore, the circuit design may be included in devices such as computers, including personal computers, servers, and personal digital assistants, in communication devices, including cellular, portable, and traditional phones, in media devices, such as televisions, radios, in transportation machines, including automobiles and aircraft, and the like.

In another embodiment, the techniques described above may be used to embed an identifier into the structure of other types of intellectual property. For example the structure of a database may be altered or influenced to include the identifier. The structures and/or functionality of graphics, visualization software, hypertext pages, multimedia, text, computer architecture, synthetic drugs, manipulated genes biotechnological compounds, chemical compounds, mechanical devices, may similarly be embedded with an identifier or watermark.

Furthermore, one embodiment of the present invention is used to read an embedded identification. In still another embodiment of the present invention, a system is used to analyze a semiconductor circuit having an embedded identification code and to determine the source of a design used in the semiconductor circuit. In yet another embodiment of the present invention, a system is used to analyze a semiconductor circuit having an embedded identification code, and to determine an authorized recipient of a design used in the semiconductor circuit.

In one embodiment, an identifier may be detected by observing the relationship between input data and output data of a device, such as circuit. In another embodiment an encrypted identifier located in intellectual property, such as in a circuit, may be decrypted using a key or the like. In still another embodiment, a key may be provided which only decrypts a portion of the identifier.

One embodiment of the present invention is a novel watermarking approach for intellectual property protection of designs and CAD tools. For example, one embodiment embeds one or more distributed encoded messages into the structural properties of designs at one or more levels of the design process with minimal hardware overhead. This is accomplished while maintaining the correctness and functionality of the designs. CAD tools may be similarly protected in the same manner by embedding signatures in designs that the CAD tools produce. One embodiment of the present invention is based on a property of design space exploration in synthesis which provides that there are numerous functionality equivalent solutions to implement a design. Thus, one can select one of the numerous solutions, which thereby encodes a signature. In another embodiment, an efficient method is provided for generating a design that satisfies the original specified constraints as well as additional watermarking constraints corresponding to the signature.

BRIEF DESCRIPTION OF THE DRAWINGS

FIGS. 6A–C illustrate an example of watermarking partitioning solutions;

DETAILED DESCRIPTION OF THE PREFERRED EMBODIMENTS

Figure 1:
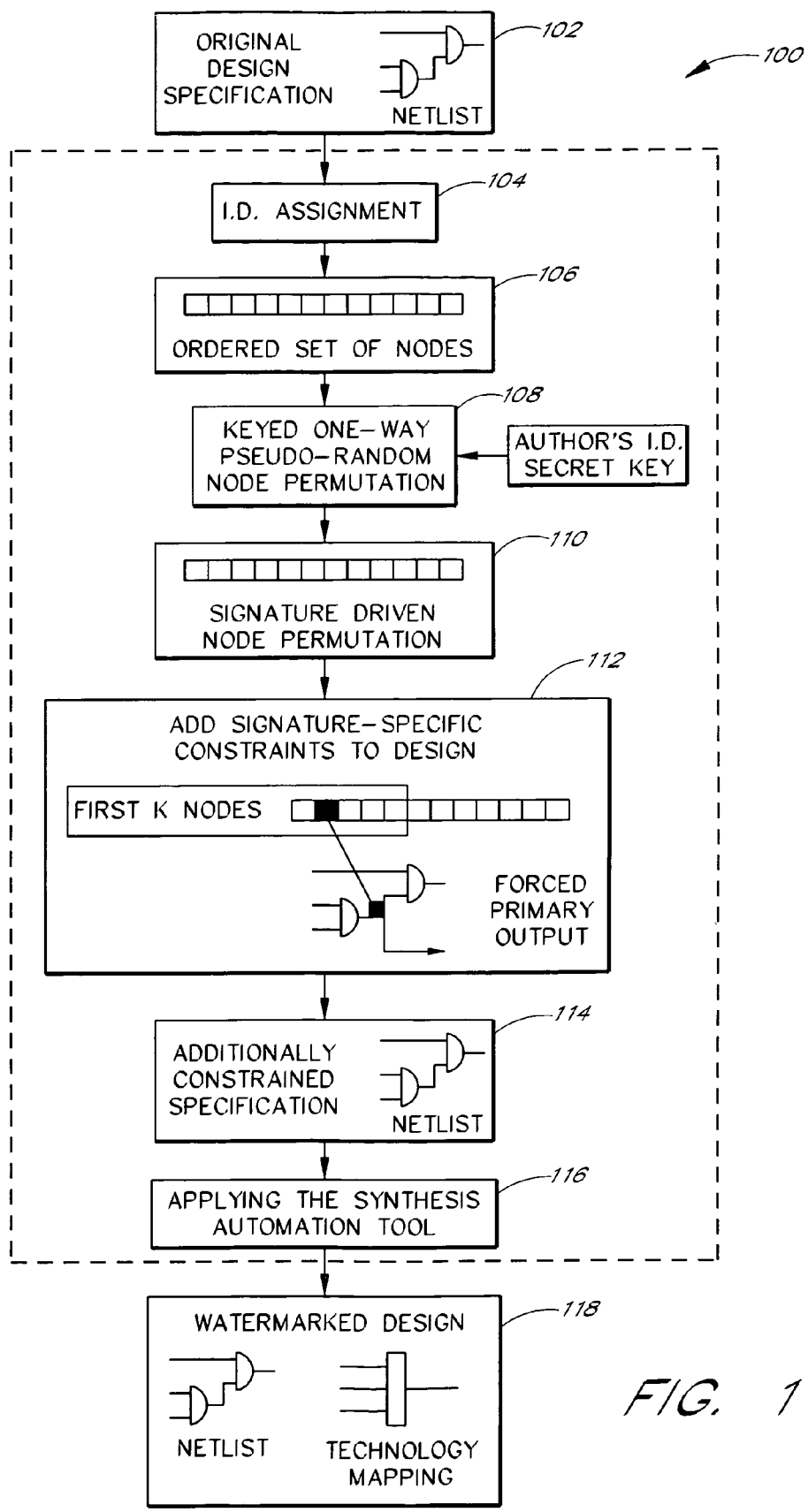
FIG. 1 illustrates one embodiment of a protocol for hiding information in solutions for multi-level logic optimization and technology mapping.

The present invention relates to methods and systems for the identification of circuits and circuit designs, and in particular, to embedding identifiers in circuits and circuit designs.

In one embodiment, a watermark, including information, such as non-functional information, is embedded into a functional portion of intellectual property, such as a circuit design. The watermark may be embedded in the functional portion by adding watermarking constraints to functional constraints, so that when the design is synthesized, the watermark will be distributed over the functional portion. Certain concepts behind one embodiment of this technique of watermarking-based intellectual property protection (IPP) are illustrated by the satisfiability (SAT) problem, which is defined as follows:

Instance: A finite set of variables U and a collection C={$c_1$, $c_2$, ..., $c_m$} of clauses over U.

Question: Is there a truth assignment for U that satisfies all the clauses in C?

For example, U={$u_1$, $u_2$} and C={{$u_1$, $u_2$}, {$\bar{u}_1$}, {$\bar{u}_1$, $\bar{u}_2$}} is an SAT instance for which the answer is positive (a satisfying truth assignment is t{$u_1$}=F and t{$u_2$}=T). On the other hand, if for C"={{$\bar{u}_1$, $u_2$}, {$\bar{u}_1$, $\bar{u}_2$}, {$u_1$}} the answer is negative. SAT is well known as the first problem shown to be NP-complete, and the starting point for establishing the known body of NP-completeness results. Many types of problems from a variety of applications may be modeled as SAT instances.

An exemplary constraint-based watermarking of an SAT solution will now be illustrated. For convenience, the 3SAT restriction of the problem, where each clause has exactly three variables, will be used. In the example, below the three variables may be selected from a set of 14 variables. Consider the following 3SAT instance:

$U = \{u_1, u_2, ..., u_{14}\}$ $C = \{\{\bar{u}_1, \bar{u}_2, u_9\}, \{\bar{u}_1, \bar{u}_3, \bar{u}_4\}, \{\bar{u}_1, u_2, \bar{u}_5\}, \{u_1, \bar{u}_2, u_{10}\},$ $\{\bar{u}_1, \bar{u}_3, u_8\}, \{\bar{u}_1, \bar{u}_3, u_7\}, \{\bar{u}_2, u_7, u_8\}, \{u_2, \bar{u}_8, u_9\},$ $\{u_3, u_2, u_8\}, \{u_3, u_5, \bar{u}_7\}, \{\bar{u}_3, u_8, u_{13}\}, \{u_3, \bar{u}_9, \bar{u}_{11}\},$ $\{\bar{u}_2, u_7, u_8\}, \{u_2, \bar{u}_8, u_9\}, \{u_3, u_2, u_8\}, \{u_3, u_5, \bar{u}_7\},$ $\{\bar{u}_3, u_8, u_{13}\}, \{u_3, \bar{u}_9, \bar{u}_{11}\}, \{u_3, u_{10}, \bar{u}_{12}\}, \{\bar{u}_4, \bar{u}_7, \bar{u}_8\},$ $\{\bar{u}_5, \bar{u}_8, \bar{u}_{12}\}, \{u_4, \bar{u}_7, u_{13}\}, \{\bar{u}_5, \bar{u}_9, \bar{u}_{11}\}, \{\bar{u}_5, u_7, u_9\},$ $\{u_6, u_{10}, u_{11}\}, \{u_6, \bar{u}_8, \bar{u}_{12}\}, \{u_7, u_9, \bar{u}_{12}\}, \{u_7, u_9, \bar{u}_{13}\},$ $\{u_9, u_{11}, \bar{u}_{14}\}, \{u_{10}, u_{11}, \bar{u}_{12}\}\}$ In one embodiment, the given 3SAT instance is altered or modified such that (i) a satisfying assignment ("solution") to the modified instance is also a solution to the original instance, and (ii) both the modified instance and the solution contain information, such as a "signature" or "identifier." The signature may be used to substantially uniquely identify the source or author of the solution, and/or may contain other information.

Enumeration of the solution space indicates that the given 3SAT instance has 556 different satisfying assignments. Additional constraints are imposed on the instance of the 3SAT problem in the form of extra 3-literal clauses, using the simple (case-insensitive) encoding A-$u_1$, B-$\bar{u}_1$, C-$u_2$, D-$\bar{u}_2$ ... Y-$u_{13}$, Z-$\bar{u}_{13}$, space-$u_{14}$ to encode a signature. For example, the signature "cat dog fox" would be encoded using the extra clauses {{$u_2$, $u_1$, $\bar{u}_{10}$}, {$u_{14}$, $\bar{u}_2$, $u_8$}, {$u_4$, $u_{14}$, $\bar{u}_3$}, {$u_8$, $\bar{u}_{12}$, $u_{14}$}} (the end of the message is padded with an extra space to maintain three littorals per clause). The signature "Watermarking Techniques for Intellectual Property Protection University of California at Los Angeles VLSI CAD LAB", adds 38 new clauses to the instance. After adding these constraints to the initial instance, the number of satisfying assignments decreases from 556 to 2. Thus, it is highly likely that any solution that has a satisfying assignment for this augmented 3SAT instance contains the embedded signature. In particular, the likelihood of someone else generating such a solution by chance is 2 in 556, or 0.00496. In this example, the addition of a watermark incurs no overhead in terms of the number of variables; the added watermark constraints simply guides which of the 556 solutions is selected.

An explanation of how, in one embodiment, the watermarking approach can be used for watermarking designs at the logic synthesis level will now be provided. One possible synthesis flow 100, which employs watermarking of combinational logic synthesis solutions, encompasses several phases, as illustrated FIG. 1.

At state 102, a design specification is created in the form of a netlist. At state 104 each gate of the logic network described by the netlist is assigned an identifier which is unique with respect to the identifiers assigned to gates in the remainder of the network. At state 106, to ensure that the watermark will not be misinterpreted, the gates in the initial logic network specification are sorted according to a standardized system. Next, K gates are selected in a way specific to the designer's or tool developer's signature. For example, at state 108 a keyed RSA one-way function may be used to generate pseudo-random bits that guide the process of iterative gate selection at state 110. The outputs of the selected gates are explicitly assigned to become temporary or pseudo primary outputs at state 112. This protocol may be applied to the technology mapping synthesis step.

In one embodiment, the protocol described above can be applied to watermark multi-level logic minimization solutions. However, in another embodiment the following protocol may be used for watermarking multi-level logic minimization solutions. Initially, this protocol also generates pseudo-primary outputs according to the user's signature, and, in addition, uses them as inputs into an additional logic network that is embedded into the initial design specification. The protocol builds the embedded network according to the designer's or tool developer's signature, or according to some other identifier.

After additionally constraining the initial design specification at state 114, the optimization algorithms are applied to the constrained logic network at state 116. A new netlist with the embedded signature is generated at state 118, appropriately mapped for the selected technology implementation, such as for a gate array or a programmable circuit. The result retrieved by the synthesis algorithm satisfies both the initial and constrained design specifications. The proof of authorship is dependent upon the likelihood that some other algorithm, when applied to the initial input, retrieves solution that also satisfies the constrained input.

In one embodiment, the watermarking process starts by assigning a unique identification $ID_i$ to each gate $G_i$ from the set G of gates that are not used as primary outputs. The unique identification number $ID_i$ is selected from the set $ID_i \in ID = \{1 \ldots N\}$ of N successive numbers, where N is the cardinality of the set G. There are two main goals in this step: to map the network into a linear array so that cryptographical tools can be directly applied, and to develop an IPP procedure in such a way that the degrees of freedom for potential attackers are greatly reduced.

As previously discussed, to avoid misinterpretation of gate ordering, a standardized gate ordering system may be used. The network is numbered in such a way that any two nodes or gates that have different functionality and different transitive fan-in and fan-out networks are assigned different IDs. However, finding whether two nodes are functionally and topologically identical is difficult using conventional methods. The special case of the problem of finding whether two networks are identical, when all gates perform equivalent functions, is equivalent to the graph isomorphism problem, which is open in terms of its complexity. As is well known, the graph isomorphism problem relates to identifying when two graphs that appear different are actually the same. Therefore, in order to identify identical networks, in one embodiment, a heuristic function, that exploits the functional and timing properties of a node, is used to sort the nodes or gates in a logic network. The heuristic function performs iterative sorting of nodes, not used as primary outputs, using a list of criteria with distinct priorities. The objective of the ordering function is to partition a logic network LN(G,C), where G is a set of nodes, and C is a set of connections between nodes, into an ordered set M of node subsets $M_i \in G$ such that each subset contains exactly one node. In one embodiment, one or more of the following list of eight criteria may be used for node identification:

1. The level $LIN_i$ of node $G_i$ with respect to the input. A node $G_i$ has a level K if the longest path in the logic network from any input to $G_i$ is of cardinality K.
2. The level $LOUT_i$ of node $G_i$ with respect to the output. A node $G_i$ has a level K if the longest path in the logic network from any output to $G_i$ is of cardinality K.
3. Number of nodes in the transitive fan-in of $G_i$ at level $K < LIN_i$.
4. Number of nodes in the transitive fan-out of $G_i$ at level $K < LOUT_i$.
5. Functionality, fan-in, and fan-out of nodes in the transitive fan-in of $G_i$ at level $K < LIN_i$.
6. Functionality, fan-in, and fan-out of nodes in the transitive fan-out of $G_i$ at level $K < LOUT_i$.
7. Functionality, fan-in, and fan-out of the fan-in and fan-out of nodes in the transitive fan-in of $G_i$ at level $K < LIN_i$.
8. Functionality, fan-in, and fan-out of the fan-in and fan-out of nodes in the transitive fan-in of $G_i$ at level $K < LOUT_i$.

Figure 2:
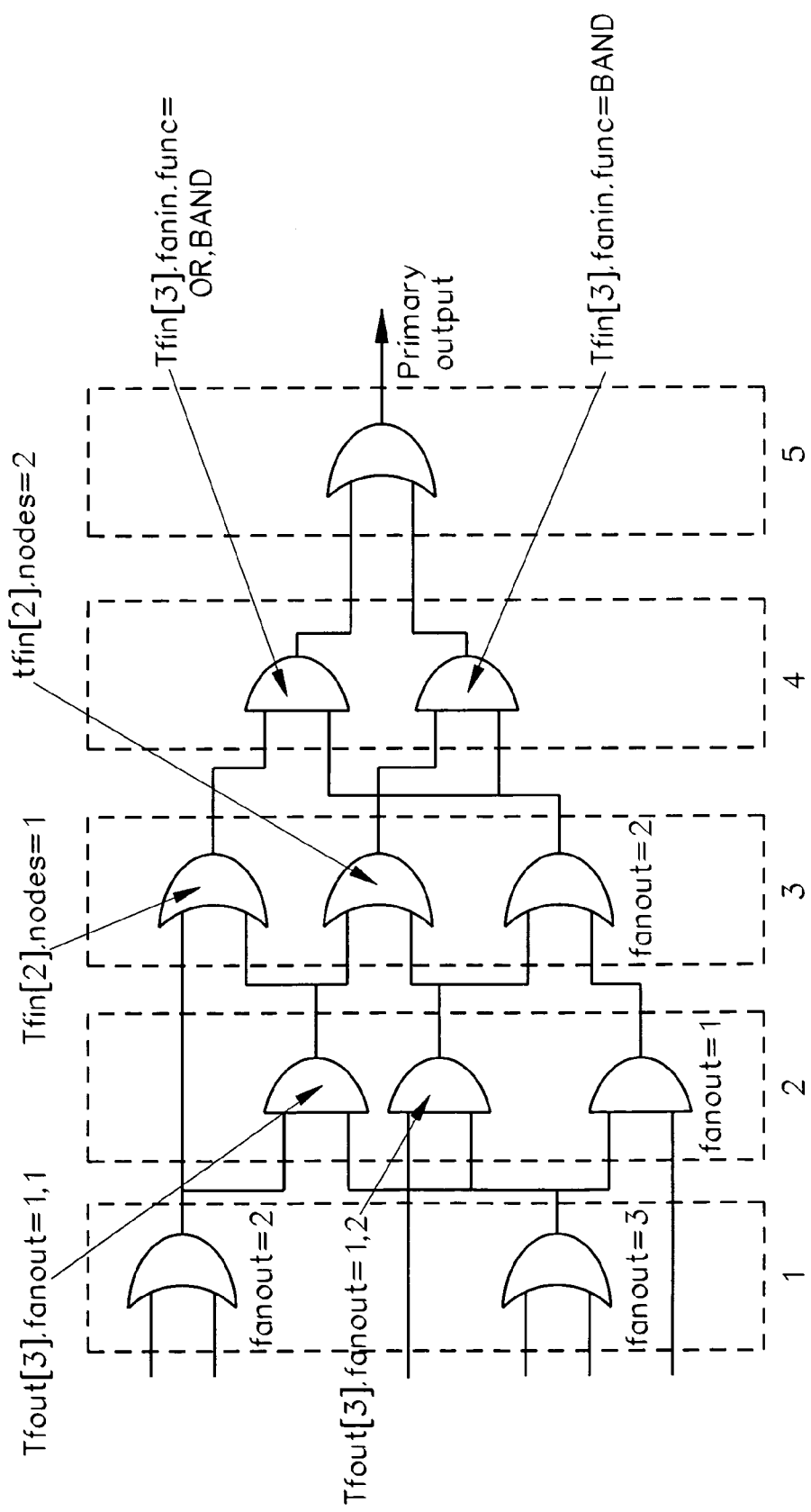
FIG. 2 illustrates one example of node ordering.

An example how nodes are identified using exemplary sorting rules is given in FIG. 2. Note that it is unlikely that two nodes have all parameters identical. This is due to the dependencies and non-symmetry between nodes in logic networks. If two nodes cannot be distinguished using the proposed set of rules, random unique identifiers may be assigned to these nodes. The assignment may be memorized for future proof of authorship. In another embodiment, the undistinguishable nodes may be excluded from the signature embedding process.

In the next phase of watermarking, from the sorted set M of non-primary nodes, a subset $S \in M$ of cardinality $|S|=K$ is selected. The selection is pseudo-random and corresponds uniquely to information to be embedded, such as the designer's or tool developer's signature. Next, each node in the selected subset S is explicitly added to the list of pseudo-primary outputs. By performing this step, the watermarking routine causes nodes from the set S to be:

visible in the final technology mapping solution.

computed during the multi-level logic minimization of the logic network. Note that many subfunctions that exist in the input logic network do not exist in the optimized output logic network.

In one embodiment, node selection is performed as follows. Typically, the node selection step of watermarking is not the computation bottleneck. Therefore, an RSA cryptographically secure pseudo-random bit-generator may be used to generate a sequence of bits, which is used in the node selection. The keys used to drive the randomization process represent the signature. The result of this phase is a digital pseudo-random signature-specific selection of combination of K network nodes.

In the case of technology mapping of LUT (look-up table) based FPGAs (field programmable gate arrays), the described node selection phase may be the last phase in the protocol. As is well known in the art, a class of maximal fanout-free cone (MFFC) nodes have been identified which are more likely to appear in the final solution than the remaining nodes. The impact of this phenomenon has been statistically evaluated with regard to the strength of the proof of authorship enabled by the watermarking approach. For each instance of the problem, the ratio of MFFC nodes in the initial input specification (rin) and in the final solution (rout)

is enumerated. The likelihood of a solution coincidence may be computed using the following formula:

$$p = \left(\frac{rout \cdot F}{rin \cdot T}\right)^{rout \cdot W} \cdot \left(\frac{(1-rout) \cdot F}{(1-tin) \cdot T}\right)^{(1-rout) \cdot W},$$

where F is the number of non-primary gates in the final solution, T is the total number of non-primary gates in the initial logic network, and W is the number of gates pseudo-randomly selected to become pseudo-primary outputs during the watermarking phase.

The protocol described for technology mapping can be applied to watermark solutions to the multi-level logic minimization problem. However, a different protocol may be used to provide even stronger proof of authorship due to embedded additional constraints. This protocol augments signature-specific constraints into the input logic network in two phases. In the first phase, which is similar to the already described protocol for watermarking technology mapping solutions, the protocol marks the outputs of selected gates as visible by explicitly denoting them as pseudo-primary outputs. In the second phase, an additional network is augmented into the input.

The additional network has as input variables the pseudo-primary output variables generated in the previous phase. The network is built according to the user's signature or other specified information. In one embodiment, the information contained in the signature is unrelated or non-functional with respect to the intended purpose or function of the circuit design. The sequence of pseudo-random bits from the previous phase is used to provide an identifier which would be highly unlikely to occur randomly. Hence, the technique described above provides at least almost certain proof as to the design source. Using this sequence, firstly, a gate G from the available library of gates is selected. Then according to the pseudo-random sequence of bits, G.fanin pseudo primary outputs are selected and used as inputs to the selected gate G. The output G.fanout is added to the list of pseudo-primary outputs. This output is subject to selection in the future iterations of this procedure. This procedure can be infinitely repeated. A possible termination policy may be established using industry adopted standards.

The additionally constrained original input netlist is fetched to the optimization algorithm (multi-level logic minimization or technology mapping). The final solution is a network of cells (or subfunctions) which contains solution to the original problem and to the user-specific augmentation of the original problem. The proof of authorship relies on the difficulty of modifying the input in such a way that the pseudo-primary outputs that correspond to an attacker's signature and the modified network that corresponds to the attacker's key have a subsolution that is a subsolution to the initial problem watermarked with the designer's or source's watermark.

The attacker may try to modify the output locally in such a way that the watermark disappears or the proof of authorship is lowered below a predetermined standard. Therefore, in one embodiment, the watermarking scheme should be such that to delete the watermark and still preserve solution quality, the attacker has to perturb a great deal of the obtained solution. This will necessitate the attacker to develop a new optimization algorithm.

The following example of embedding a watermark in a design that has a total of 100,000 gates illustrates the difficulty in removing a watermark. In this example, in the final solution S, 10,000 nodes are visible (LUT or cell outputs) and therefore the average probability, that a node from the initial network is visible in the final solution, is $$p = \frac{1}{10}.$$

If the watermarking strategy results in a pseudo-random selection of 1,000 visible vertices, the average probability that a node, visible in S, is visible in a solution obtained by some other algorithm is p. That is, if the challenging algorithm retrieves a solution of the same quality. The probability expectation P, that some other algorithm selects exactly the same subset S of nodes in the final solution, is $P=p^{1000}$ or one in $10^{1000}$. An attacker may aim to reduce the likelihood of authorship by doing local changes to the design in order to remove the watermark. However, to reduce the proof of authorship to one in a million, the attacker has to alter 851 node from the watermark, i.e. 85.1% of the final solution. To remove the watermark in such a way that the remaining proof of authorship is P=0.1 the attacker has to modify 888 vertices in the watermark or 88.8% of the entire technology mapping solution.

There are at least two techniques the attacker may use to try to embed his or her signature in an already watermarked solution. The first technique is a top-down approach, where the attacker modifies the input hoping that the tool will produce an output that contains attacker's signature, though the output may also contain the author's signature. Since node permutation is pseudo-randomized, the likelihood that attacker's signature appears in the output is the same as the probability of two different algorithms retrieving the same solution. Thus, this attack is less efficient than trying to delete the signature.

The second technique is a bottom-up approach. In the bottom-up approach, the attacker concludes from the output (or its modification), what input will produce an output that contains her or his signature. However, in order to produce such input (and possibly output), the attacker has to know which pseudo-random selection of nodes (and augmented network) corresponds to a specific input sequence. In one embodiment, the attacker may obtain such information only if the reverse to the one-way function is known. However, RSA-type one-way hash functions such inverses are not known, and thus, when such hash functions are used, the attacker will fail.

Figure 3A:
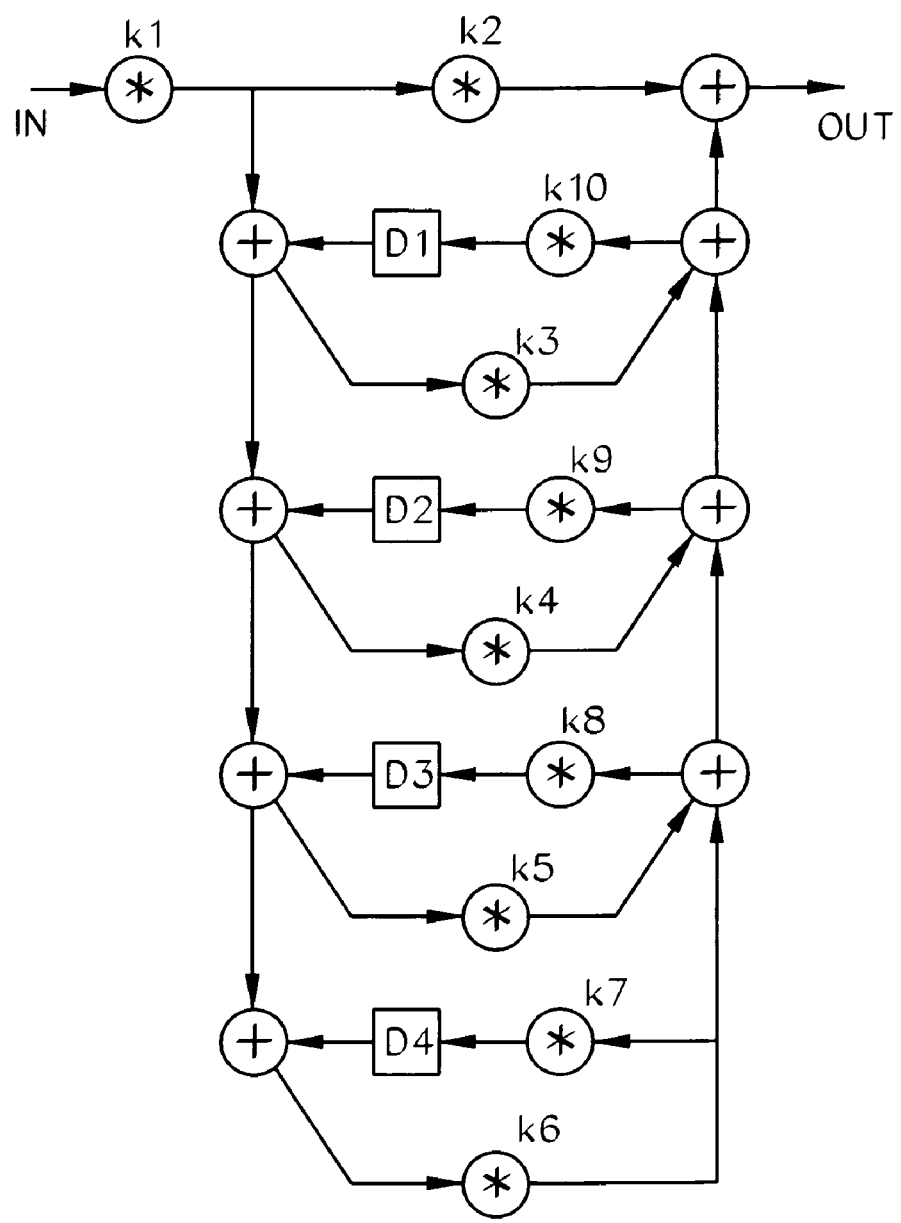
FIGS. 3A–D illustrate one embodiment of an exemplary 4th order CF IIR filter design suitable for watermarking.
Figure 3B:
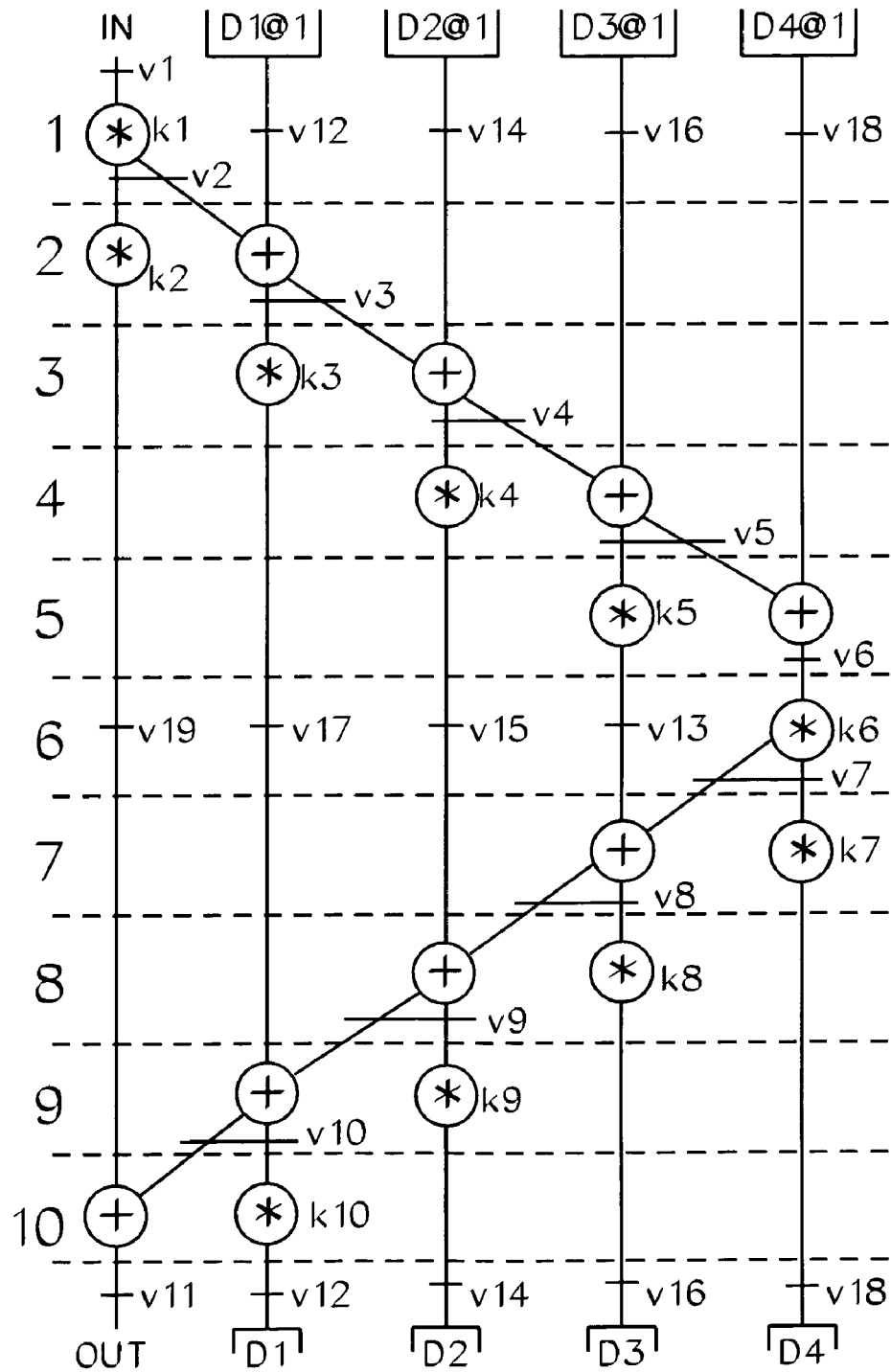

To further illustrate several important concepts behind the novel watermarking method, an exemplary embodiment of a system and method of watermarking a design at the behavioral level will now be described. Referring to FIGS. 3A–D, the illustrated design is a 4th order continued fraction infinite impulse response (CF IIR) filter. FIG. 3A shows the control data flow graph (CDFG) for the filter, including 4 delay elements D1–D4 and 10 constant multiples k1–k10. FIG. 3B presents a scheduled CDFG for the filter. The illustrated schedule uses 10 control steps, represented by the 10 rows, labeled 1–10, and the 4 delay elements, represented by the 4 vertical lines D1–D4. The variables are represented by v1–v19, and the constants are represented by k1–k10.

Values that are generated in one control step and used in a later step are stored in a register during the intermediate control step transitions. A variable is "live" between the time it is generated (written) and the last use (read) of it. This interval is called the lifetime of the variable. Two variables whose lifetimes do not overlap, such that they are not used in the same control step, can be stored in the same register. Referring to FIG. 3B, variables used in the same control step row have overlapping lifetimes and therefore cannot use the same register.

The interval graph, such as that illustrated in FIG. 3C, can be constructed as follows: For each variable v1–v9, a node is made in the interval graph. Two nodes are connected if the lifetimes of the corresponding variables overlap. Register allocation can be performed by coloring the interval graph. The graph coloring problem is formally defined as follows:
Problem: GRAPH K-COLORABILITY
Instance: Graph G=(V,E), positive integer K≦|V|.
Question: Is G K-colorable, i.e., does there exist a function f:V→{1,2, ... K} such that f(u)≠f(v) whenever {u,v}∈E?

The GRAPH K-COLORABILITY problem is generally solvable in polynomial time for K=2, but remains NP-complete or difficult to solve for all fixed K≧3. The left-edge algorithm is optimal for the interval graphs constructed from CDFGs with no loops.

Figure 3C:
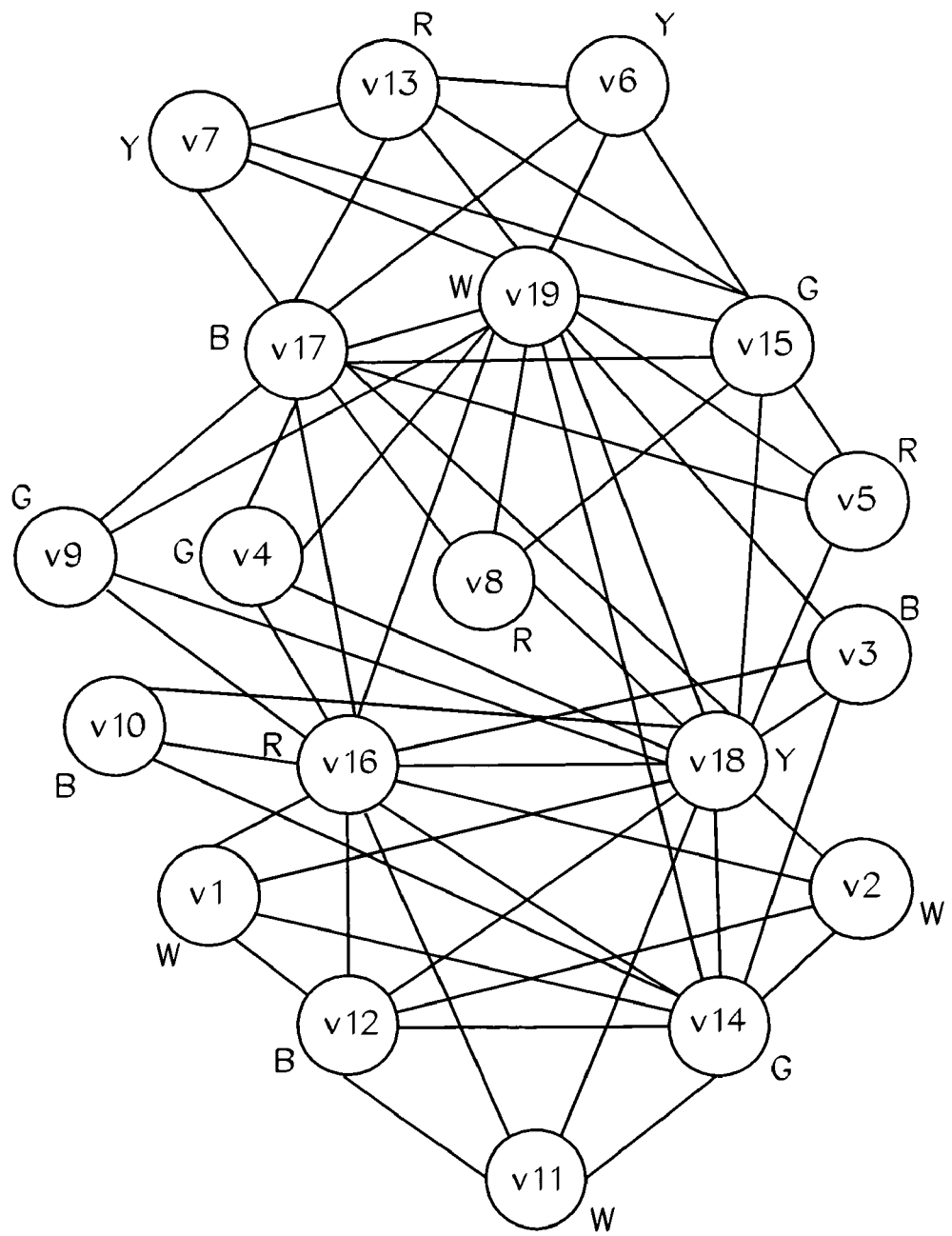
Figure 3D:
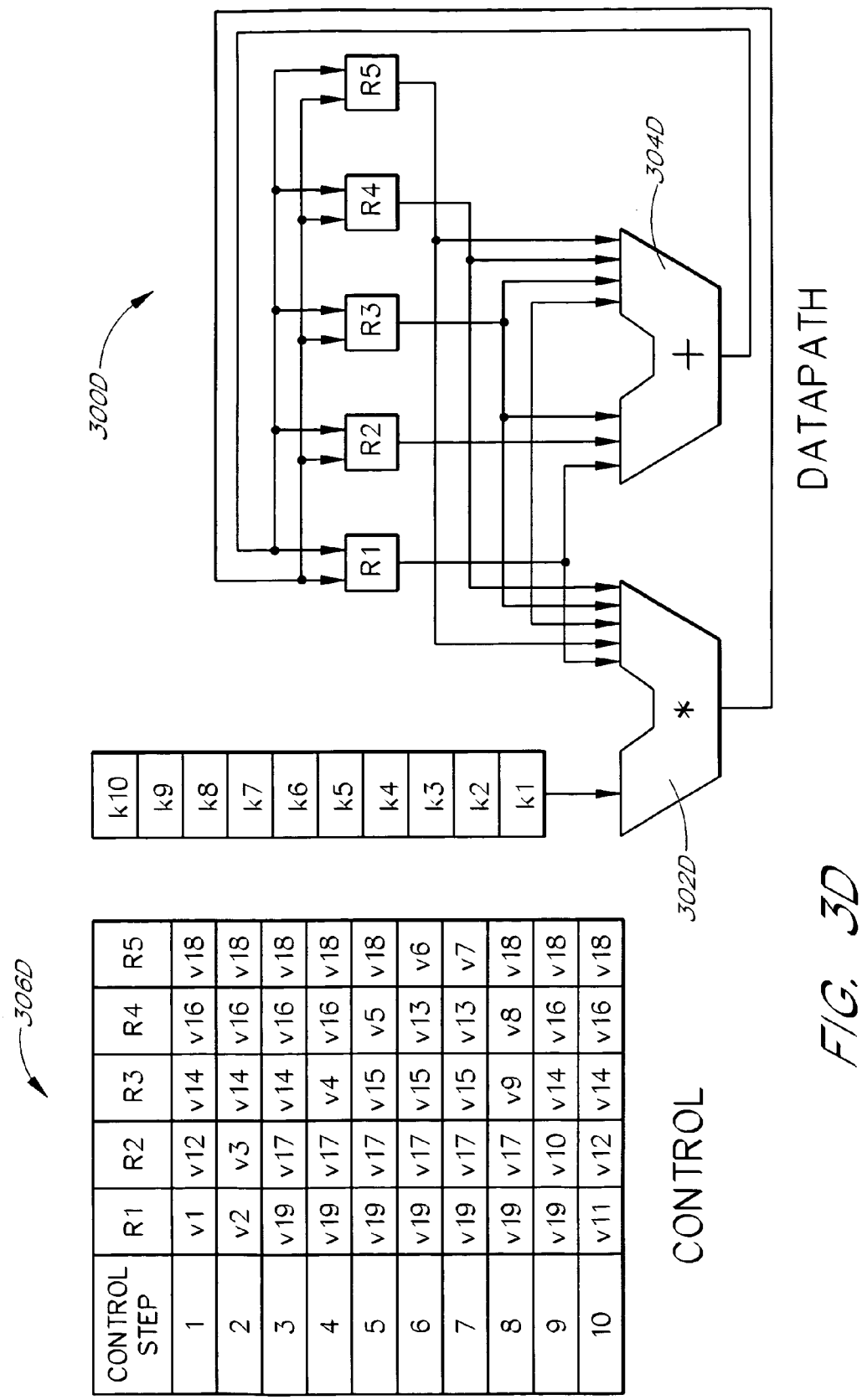
Figure 4A:
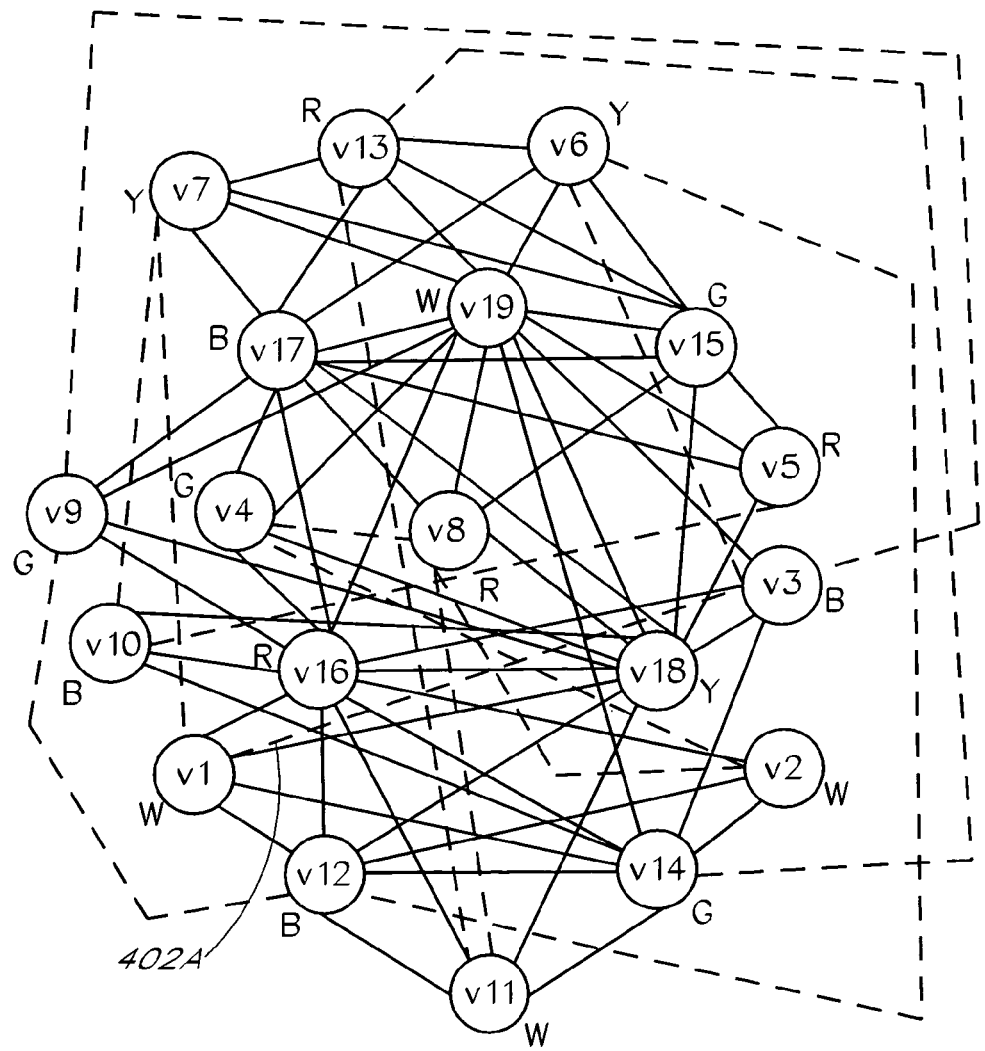
FIGS. 4A–B illustrate embedding the signature "A7" into the register allocation solution illustrated in FIG. 3C.

The interval graph for the present example is illustrated in FIG. 3C. Since there are several cliques of size 5 (for example $v_1, v_{12}, v_{14}, v_{16}, v_{18}$), at least 5 colors are needed, for the graph. In this example, the each of the 5 colors represents a corresponding register used to hold corresponding variables. A clique of size k is a complete subgraph on k nodes, i.e., a set of k nodes such that every two nodes in the set are connected by an edge. A coloring solution with 5 colors (White, Black, Green, Red, and Yellow) is illustrated in FIG. 3C. Note that this solution achieves the minimum bound. FIG. 3D shows the resulting datapath 300D and control 306D, indicating which registers are used to store which variables at a given state, with 1 adder 304D, 1 multiplier 302D, and 5 registers R1–R5 after register allocation and binding is performed. In addition to optimizing the design in terms of the number of registers, the control and datapath is embedded with a watermark, "A7", as illustrated in FIG. 4A, as discussed below. The watermark is extremely difficult to detect without knowing the encoding rules.

Figure 4B:
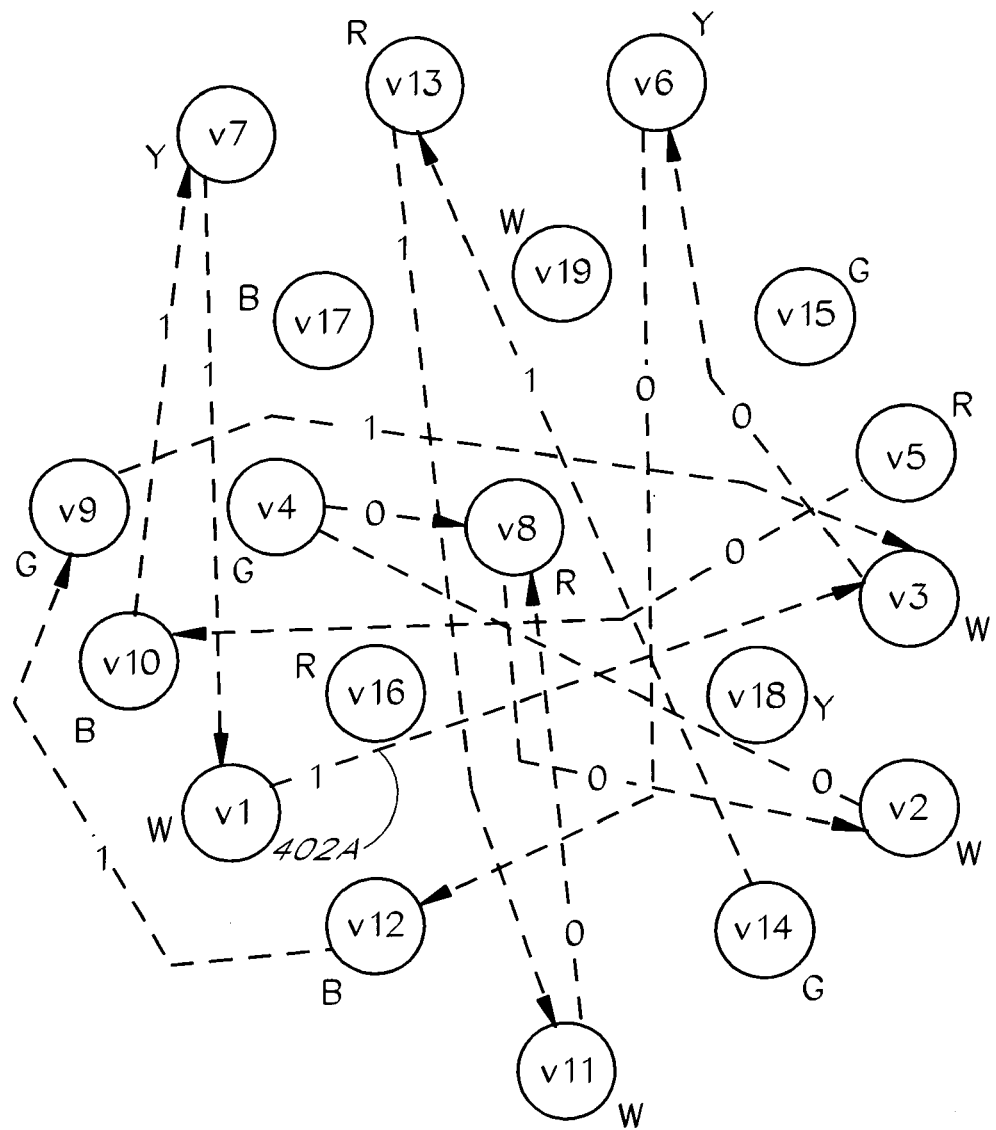

As previously discussed, in one embodiment, the novel identification technique utilizes the addition of a set of extra constraints which encodes the author's signature or other information. For the register allocation problem, the extra constraints are imposed such that a set of variables are forced to be stored in different registers, even though the variables have different lifetimes, which result in extra edges in the interval graph. An exemplary interval graph, including extra or additional edges, is illustrated in FIGS. 4A–B. FIG. 4A shows all the edges, while FIG. 4B shows only the added edges, indicated by dashed lines, used to embed the signature. The illustrated graph includes variables v1–v18. By way of example, an extra edge, indicated by a dashed line 402A, is added between v1 and v3. Therefore, even though variables v1 and v3 have different lifetimes, and thus could share the same register, the added edge constrains the actual implementation, preventing v1 and v3 from sharing the same register.

In one embodiment, ASCII encoding of the characters is used in creating a watermark. As is well known to one of ordinary skill in the art, 7 bits are used to encode a character in the ASCII code. The interval graph nodes are sorted and numbered in the increasing order of the length of their lifetimes. In the increasing order of node numbers, each node is considered for embedding a single bit. Each consecutive 7 added edges represent a character in the ASCII code. After all the nodes are considered, the processes is repeated starting at the first node in the order. For each bit in the watermark, the terminal node is chosen such that the terminal node number represents the bit value. To embed a "1", the terminal node of the added edge has an odd number. To embed a "0", the terminal node of the added edge has an even number. The first feasible node in the increasing order of node numbers, starting from the position right after the terminal node of the last edge added, is selected as the terminal node to embed the bit value. In one embodiment, this technique adds or distributes extra edges more evenly in the graph. The added edges with their encoded values used to embed the signature in the example illustrated in FIG. 3C are illustrated in FIG. 4B. The added edges used to represent "A7" pair the nodes as follows: (1,3), (2,4), (3,6), (4,8), (5,10), (6,12), (7,1), (8,2), (9,3), (10,7), (11,8), (12, 9), (13,11), (14,13). Thus, the added edges encode 14 bits, "10000010110111" in binary, equal to "A7" in the ASCII code.

The probability that any register allocation method will result in the same solution with the watermark is extremely low for circuits whose graphs have reasonably many nodes. For example, the interval graph in FIG. 3C has 35 unique coloring solutions, representing 35 possible register allocations, using 5 colors, representing 5 registers. Therefore, there is only a 2.9% chance that a given register allocation method would find the same solution, assuming uniform probability for all possible 5-color solutions. Considering that the interval graph illustrated in FIG. 3C consists of only 19 nodes, the figure of 2.9% is good, illustrating how unlikely it would be for the same solution to occur. Further, even for this small illustrative example, a fairly large 14 bit signature, representing "A7", was embedded. It has been experimentally demonstrated that there are many competitive solutions for graphs with a relatively low number of nodes. Furthermore, in one embodiment, the technique described above is progressively more effective for large designs.

The exemplary technique described offers several important advantages. The described technique provides for the quantitative treatment of intellectual property protection. Furthermore, the watermarking approach described above provides for the intellectual property protection of designs, algorithms, CAD tools, and compilation tools.

In one embodiment, the watermarking technique is substantially transparent to manual and automatic design processes, and therefore can be used in conjunction with standard design tools. The generic technique is applicable to all design steps. The technique also provides the ability to efficiently embed signatures, such as that of the designer or owner, efficiently, in many different ways.

The encoded quantitative message or watermark may be combined with cryptographic techniques, providing many advantageous options for intellectual property protection, including, for example, remote erasable signatures, as later described.

The watermarking technique allows many degrees of freedom to the designer regarding the selection of signatures such as what encoding schemes should be used, how many different signatures should be used, how large they should be, and exactly in which parts of the design they should be embedded.

Furthermore, another novel feature of one embodiment of the present invention is the use of error correcting codes in conjunction with watermarking. The use of error correction codes provides for the greatly enhanced reliability of the intellectual property protection techniques described above, and provides a mechanism for the detection of attempts to remove signatures by unauthorized persons.

Thus, one embodiment of the present invention advantageously provides strong watermarking techniques with low hardware overhead, a distributive nature, resilience against tampering, and/or CAD tool transparency.

A synchronous data flow (SDF) model may be used with one embodiment of the present invention. The SDF is a special case of data flow in which the number of data samples produced or consumed by each node on each invocation is specified a priori. In other embodiments, other techniques, such as the dynamic invocation of nodes, may be used as well. Nodes can be scheduled statically at compile time onto programmable processors. In particular, homogeneous SDF (HSDF), where each node consumes and produces one sample per execution, may be used. The HSDF model is well suited for specification of single task computations in numerous application domains such as digital signal processing, video and image processing, broadband and wireless communications, control, information and coding theory, and multimedia. Thus, the HSDF model lends itself to the watermark embedding process described herein.

The syntax of a targeted computation is defined as a hierarchical control-data flow graph (CDFG). As previously discussed, the CDFG represents the computation as a flow graph, with nodes, data edges, and control edges. The semantics underlying the syntax of the CDFG format, as already stated, is that of the synchronous data flow model.

The watermarking method may be applied to other computational and hardware models since, in one embodiment, the described method is based on adding more constraints, which can be done in other computational and hardware models.

The following is a description of various exemplary design and synthesis phases, one or more of which may be used to embed a watermark by adding additional constraints.

Scheduling is the process of partitioning the set of arithmetic and logical operations in the control data flow graph into groups of operations so that the operations in the same group can be executed concurrently in one control step, while taking into consideration possible trade-offs between total execution time and hardware cost. In the scheduling step, the total number of control steps needed to execute all operations in the control data flow graph, the minimum number of functional modules for design, and the lifetimes of the variables are determined. The lifetime of a variable spans between the control step at which the value is first computed and the control step at which all variables dependent on its value have been computed. For scheduling, there are at least two basic approaches: (i) heuristics and (ii) integer linear programming (ILP). Priority-based heuristics, such as force-directed scheduling, may quickly generate solutions that may be good, but not optimal, while the ILP methods may more slowly produce optimal solutions.

Typically, in force directed scheduling, the nodes which have the most strict scheduling constraints are scheduled first. Preferably the scheduling is performed such that the least number of constraints are thereby imposed on still to be scheduled nodes. Thus, in one embodiment, a circuit design may be analyzed to determine its complexity. If the design is complex, the heuristic approach may be used. If, instead, the design is simple, the ILP method may optionally be used.

An allocation design phase determines the type and quantity of resources such as storage units, functional units, such as adders, multipliers, and multiplexers, and interconnect units used in a given data path. Binding is the process of assigning each operation to a functional unit, each variable to a storage unit, and each data transportation occurrence to an interconnect unit. In register allocation and binding, values that are generated in one control step and used in another control step are assigned to registers. Register allocation may be done not only to minimize the number of registers, but also to minimize the interconnect cost. In order to minimize the number of registers used, register sharing is used, allowing different variables to share the same registers. As discussed above, two variables can share a register if their lifetimes do not overlap. Many well-known register allocation algorithms focus on either unconditional register sharing or conditional register sharing for control data flow graphs that contain no loops. In one embodiment, register allocation and binding is performed after scheduling is finished. In interconnect allocation and binding, an interconnect unit such as a multiplexer or bus is assigned for each data transfer among I/O ports, functional units, and storage units.

Transformations are alterations of a computation algorithm such that its functionality is maintained. Typical transformations used in behavioral synthesis include retiming, pipelining, associativity, commutativity, inverse element law, unfolding, and common subexpression elimination. Behavioral level transformations provide the ability to improve area, throughput, latency, power, transient and permanent fault tolerance, and other design metrics.

Template mapping is the process of mapping high-level algorithmic descriptions to specialized hardware libraries or instruction sets which involves template matching, template selection, and clock selection. Template matching is the process of detecting possible matches. The fundamental difficulty for template matching lies in the fact that the number of template matches can be extremely large and the possibility of enumerating all matches may be prohibitively time consuming.

The use of error correction codes with signatures will now be described. As previously discussed, the reliability of the described intellectual property protection techniques may be enhanced by employing an error correcting and detection code for the embedded signature. In addition to providing enhanced reliability, the error correcting and detection code can provide a mechanism for detection of attempted signature removal by unauthorized persons.

In one embodiment, BCH error correction codes may be used to encode the signature data. For any positive $l(l \geq 3)$ and m $(m<2^{l-1})$, there exists a binary m-bit-Error-correcting BCH codes for the k-bit signature, where $k=2^l-1$. The variables k, l, m may be arbitrary positive numbers that satisfy the specified constraints. Other common error correction codes include wide classes of convolutional and block error-correction codes.

The error correction codes may be imposed over a plurality of logic or physical areas or blocks, such as look-up tables or FPGA configurable logic blocks. Thus, if the signature is damaged as a result of an attempted deletion, the signature may still be recovered using the error correction code.

An approach which facilitates a consistent quantitative approach for intellectual property protection using watermarking techniques will now be described. In particular, the discussion will focus on some relevant objective criteria. First, watermarking properties related to the quality of the associated data hiding technique will be discussed. In addition, numerical metrics, which quantify the effectiveness of a steganography (i.e., "hidden writing") technique for design properties will be discussed.

In one embodiment, to enhance the watermark's effectiveness, the watermark should exhibit one or more of the following properties.

1. Correctness of Functionality. In one embodiment, the correctness of functionality such as timing and design requirements should preferably not be adversely affected by the watermark.

i. Low Hardware Overhead. In one embodiment, the watermark should result in low or no design performance overhead in one or more categories, such as area utilization, gate utilization, timing, testability, and/or power consumption.

ii. Transparency. In one embodiment, the addition of a watermark to designs is substantially transparent to existing CAD tools so that the watermark can be used without modifying the existing tools. Thus, in one embodiment, the watermarking process is performed as a preprocessing or a postprocessing step.

iii. Proof of Authorship. In one embodiment, the watermark is readily detectable by, for example, the owner and/or law enforcement authorities. In another embodiment, the watermark identifies the owner with great probability, and has an associated convincing mathematical proof of the watermarks quality.

iv. Difficult to Detect. In one embodiment, the watermark is unobtrusive or substantially invisible to a potential thief. If the mark is difficult to find, it will be difficult for thieves to remove. Thus, special knowledge, such as that in the possession of the designer or owner, is preferably needed to detect the watermark.

v. Resilience. In one embodiment, the watermark should be difficult or impossible to remove, at least without significantly degrading the quality of the original design: Preferably, the watermark should be difficult to remove by techniques which do not have complete or substantial knowledge of the design. In particular, resilience against the standard optimization techniques and local reengineering approaches is achieved by one embodiment of the present invention. Furthermore, in one embodiment, the watermark is fault tolerant so that even if part of the mark is removed, the authorship message is still preserved. Note this property is in particular attractive from the legal point of view, because it implies the intention of the party which tried to remove the watermark to gain unlawful advantage. In particular, it is important that subsequent design steps in the synthesis process do not inadvertently remove the watermark. For example, text-level watermarking at the VHDL-level may be lost after the translation to register-transfer or transistor level and therefore may provide inadequate protection.

vi. Proportional Part Protection. In one embodiment, the watermark may be distributed over all or a portion of the design in order to facilitate the protection of not only the complete design, but also its parts. In another embodiment, more valuable parts are proportionally more strongly protected.

From the objectives for the watermark, the following metrics which allow the comparison and evaluation of different watermarking techniques will now be discussed.

i. Strength of the Authorship Proof. In one embodiment, the probability of coincidence, $P_C$, that the same design with the watermark is produced by any other authors should be minimized. The probability is proportional to the probability that any specific design is produced by a synthesis tool or by a manual design. For example, if there exist k designs of the same quality, the probability that any one of them is produced by a design procedure is defined as $1/k$. A larger k provides more convincing proof of the authorship.

ii. Resilience. The more difficult to remove, the better the watermark. There are several properties that indirectly allow low removability. First, the invisible or near invisible watermark can prevent some thieves attempting to remove it at the first hand. If thieves could find it, they would try to remove it. Secondly, providing more fault tolerance to the watermark can be helpful in achieving lower levels of removability. Thirdly, when the watermark is distributed all over the design, it is more likely that the watermark cannot be successfully removed. Therefore, resilience may be by the following parameters: (i) the probability that k bits of the watermark is removed by random tampering, e.g., changing a register assignment of one variable in register binding (ii) the number of bits in the watermark, and (iii) the percentage on the number of bits which can be removed while preserving the initially encoded authorship message.

iii. Design Metrics Degradation. In one embodiment, the degradation of the design metrics by the watermark should be minimized so as not to degrade the overall performance of the design. This metric may conflict with the resilience metric discussed above. Therefore, the levels of resilience and design metrics degradation is carefully determined. The design metrics degradation is quantitatively expressed by a percentage alteration of the relevant design metrics due to the embedding of the watermark. For example, in our motivational example the area overhead in terms of the number of registers is 0%.

In one embodiment, the above described novel approach uses the addition of a set of design and timing constraints to encode a signature. The constraints are selected in such a way that there is minimal or acceptable hardware overhead impact while embedding a signature that is difficult to detect and remove. The selection of the constraints depends on the employed encoding scheme. Without adequate metrics, such a selection may be unnecessarily difficult. However, the described metrics for the quantitative analysis of watermarking techniques may advantageously be used to guide the selection of the encoding scheme.

An exemplary encryption technique will now be discussed. As described below, the watermark may be encrypted using a private key. A public key may be provided and used for decryption. Thus, someone attempting to forge another party's signature will be prevented from doing so unless they have the corresponding private key.

The described technique can be also applied to remotely erasable signatures, which may be used to ensure the anonymity of the design source. The author can erase his/her signature from the design just by erasing the file with the encoding information. Usually, however, the file is still available on a backup tape. The system can automatically remove the file from both the file system and all the backup tapes on which the file is stored, using cryptography. When a file is backed up to tape, the file is first encrypted using a randomly generated key and the encrypted version is stored on the tape. The key should be known only to the operating system. When the user wishes to remove the file from the backup tape, he instructs the operating system to "forget" the key used to encrypt the file. This approach can be used to make it difficult to determine the source of the design, if so desired.

First, the signature data to be embedded is selected. In one embodiment, the selected signature data identifies the author or owner of the design. The selected signature data is then encoded so that the signature can be embedded in the design. Different encoding schemes may result in different quality watermarking solutions. However, by using a cryptographic technique, the encoded message produced by the different encoding schemes can be transformed to a pseudo-random bitstream. After selecting the encoding scheme for the signature data, the encoded signature data is enciphered and then embedded. The randomization and embedding process may be chosen such that the statistical distribution of the embedded signature is similar to that of the functional design. For example, one can first collect statistics of a particular design features, and consequently generate signature which has the same statistical properties using standard random number generation techniques. This provides at least two advantages. First, it strengthens the proof of authorship by allowing only the holder of the secret key to decipher the signature data. Next, it makes the signature data look like a random bitstream so that the detection of the signature data by unauthorized users using any statistical analysis becomes more difficult.

In addition, the signature may be compressed using Hoffman encoding, arithmetic coding, Ziv-Lempel encoding or any other compression technique.

In one embodiment, the message may be enciphered using the following steps. First, the author's or source's plain text signature data is applied to a cryptographic hash function, such as a MD5 cryptographic hash function. The generated hash is encrypted by the public key of the designer using RSA public key cryptosystem. Using the obtained cipher as an input, an RC4 stream cipher generates a pseudo-random keystream. This keystream is combined with the plaintext signature data by a bitwise exclusive-or operation to produce the ciphertext signature data. Finally, the ciphertext signature data is embedded as extra constraints in the design.

As described in the example above, ASCII encoding for the characters may be used in watermarking, using, for example, graph coloring. The interval graph nodes are sorted and numbered in the increasing order of the length of their lifetimes. In the increasing order of node numbers, each node is considered for embedding a single bit. Each consecutive 7 added edges represent a character in the ASCII code. After all the nodes are considered, the process is repeated from the first node in the order. For each bit in the watermark, the terminal node is chosen such that the terminal node number represents the bit value. To embed 1, the terminal node of the added edge should have odd number. To embed 0, the terminal node of the added edge should have even number. The first feasible node in the increasing order of node numbers, starting from the position right after the terminal node of the last edge added, is selected as the terminal node to embed the bit value. This scheme is to add extra edges more evenly in the graph.

As previously described, the reliability of the intellectual property protection techniques discussed above against design tampering may be enhanced using an error correcting and detection code for the embedded signature. The m-bit error correcting BCH codes may be used to encode the signature data.

Among the metrics, the probabilities of coincidence and tampering of the watermark are good indicators of its protection strength. For the purposes of the following discussion, the use of the terminology "probability" does not follow its exact meaning from mathematics in a rigorous sense. The "probability" in this subsection is rather used as an approximation to the actual probability. The formula for computing the probabilities for random graphs in graph coloring is provided below. For other synthesis tasks, the probabilities can be similarly defined and computed. For a random graph $G_{n,p}$ with n nodes and edge probability p, suppose c colors. Representing registers, are used and k edges are added as watermarking constraints. Let $P_C$ denote the probability of generating the same coloring solution with the signature, given the solution uses the same number of colors.

$$P_C = \left(1 - \frac{1}{c}\right)^k$$

The probability that any register allocation method will result in the same solution with the watermark is extremely low for graphs, and thus the corresponding design, with reasonably many nodes. For example, consider a random graph $G_{1000,0.1}$, that is, a graph with 1,000 nodes, with a 10% probability that a node is connected to another node, with 23 colors. The nodes represent variables, and the colors may represent registers. Suppose, for example, the watermark uses 4,990 extra edges. The probability that any two nodes with no connecting edges are assigned different colors, is $$1 - \frac{1}{23}.$$

The probability that all 4990 pairs of nodes in the watermark are assigned different colors, is:

$$\left(1 - \frac{1}{23}\right)^{4990} \approx 4.65 \times 10^{-97}$$

Experimental results have shown that no register overhead for this exemplary watermark is incurred. Let $P_T$ denote the probability of that one or more signature bits will be changed by changing the color of one node. By way of example, changing the color of a node may represent changing an assignment of a variable to a given register. $P_T$ is approximated by:

$$P_T = 1 - \left(1 - \frac{k}{\frac{n(n-1)(1-p)}{2}}\right)^{\frac{n}{c}-1}$$

The calculation is based on the following reasoning. On average, there are n/c nodes with the same color. The probability that no signature bit is removed as a result of a node color change can be approximated by the probability that there are no encoded edges between the n/c nodes with the same color.

From these formulas, $P_C$ decreases exponentially as the number of bits in the signature increases. Thus, it is better to use a larger signature to prove the authorship. $P_T$, by contrast, increases as the number of bits in the signature increases, which means that it is better to use a smaller signature to prevent tampering. These two attributes are therefore in tension. This problem can be resolved by using error-correcting codes. A low $P_C$ and a low $P_T$ can both be achieved by embedding a large signature with m-bit error correcting codes, where m should increase as the number of bits in the signature increases. The probability of tampering after m-bit error correcting codes are used, is approximated by $$\sum_{i=m+1}^{\frac{n}{c}} P_i,$$

where $P_i$ is the probability that i encoded edges are removed by changing colors of one node. $P_i$ is approximated by $$\frac{P_T}{2^i}.$$

Variables in the original design often disappear after the application of transformations. A signature, such as a digital identifier, is embedded by providing such constraints that particular or selected variables will remain after the application of transformations. For example, associativity transformation can be used to embed a signature. The following encoding scheme can be used: First, all the operations in a design are randomly numbered. A variable x from operation x represents 1 if x is even. Otherwise, the variable represents a 0. Following the order in the list, for each bit, the first variable that can represent the value of the bit is located. By way of example, BCD (binary coded decimal) encoding for a decimal digit may be used.

Figure 5A:
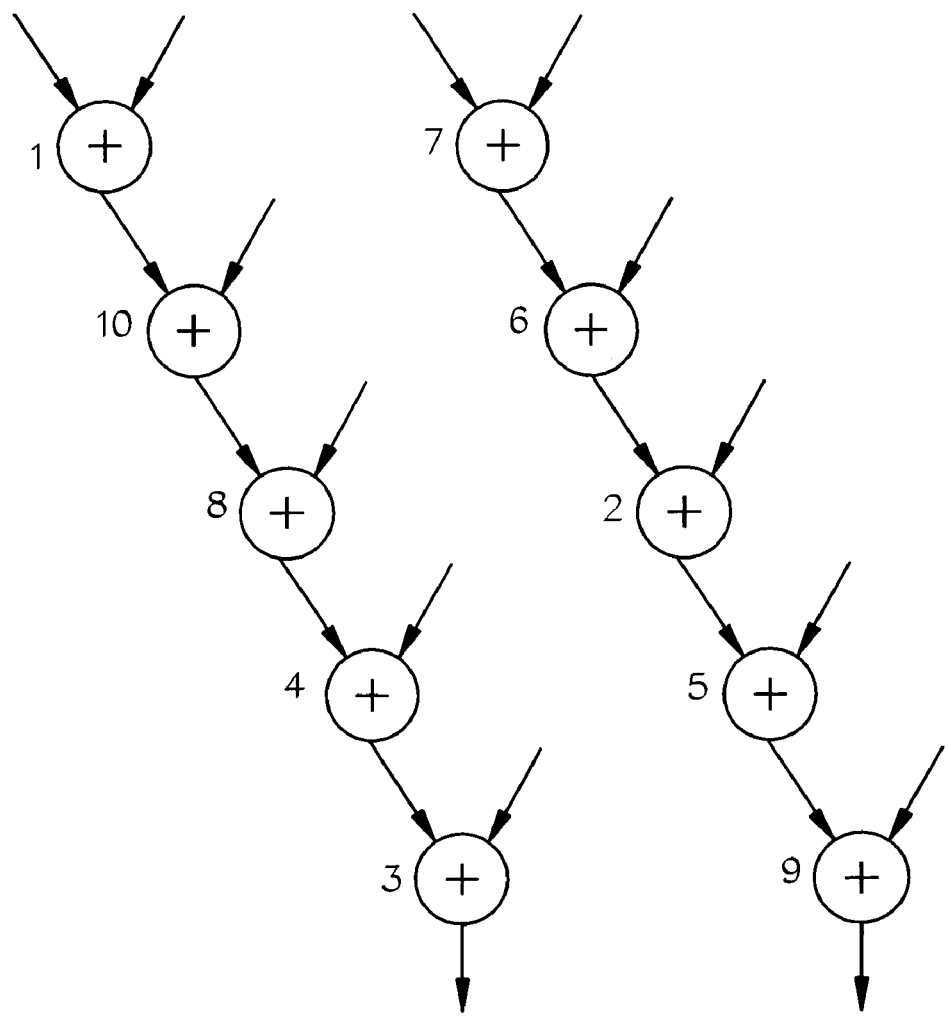
FIGS. 5A–C illustrate an example of watermarking transformation solutions.
Figure 5B:
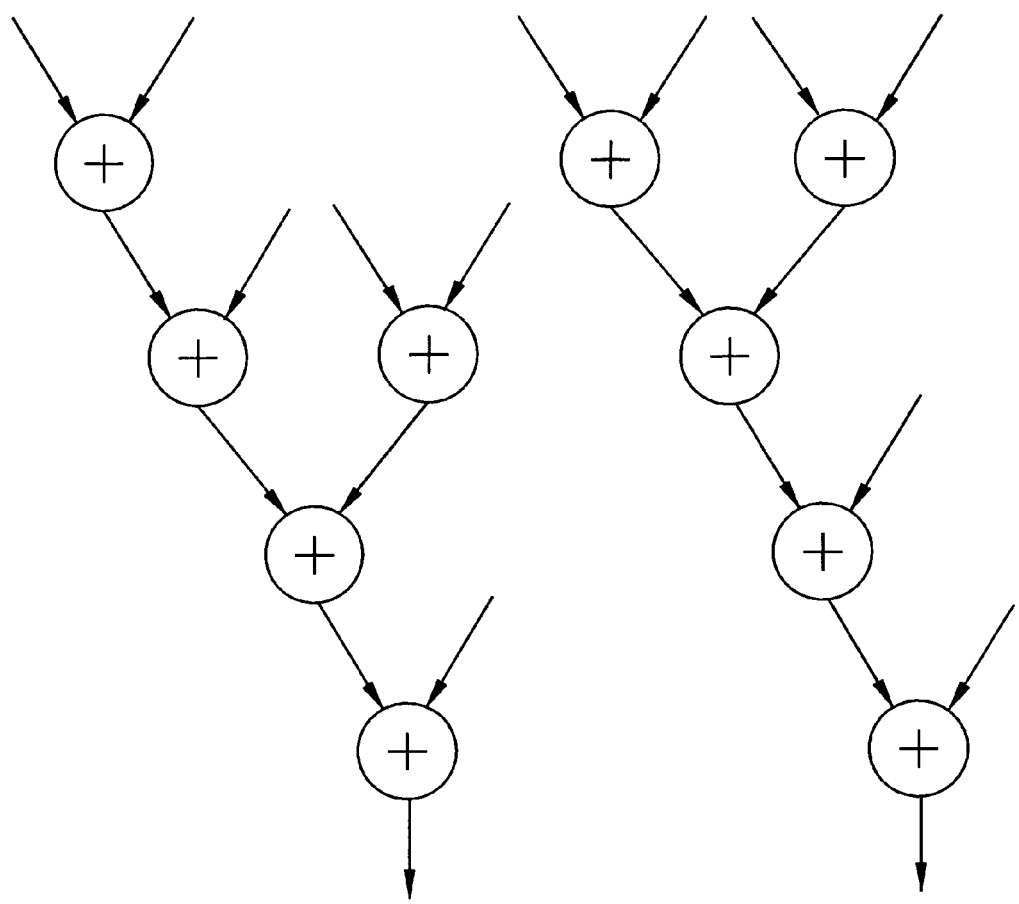
Figure 5C:
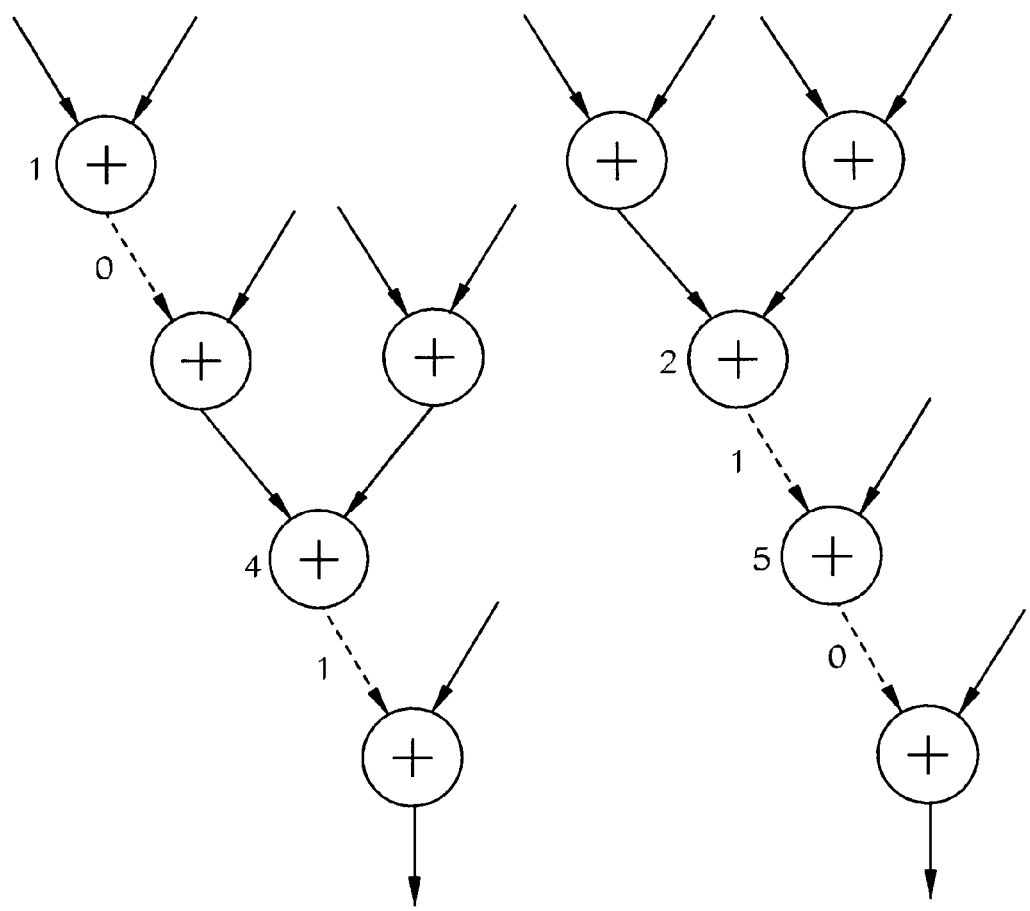

FIG. 5A illustrates an exemplary computational structure represented by a control data flow graph. This example assumes that it has been specified that the illustrated operation is to be completed in 4 clock cycles. A corresponding transformed control data flow graph after applying associativity is illustrated in FIG. 5B. The design is embedded with a signature "6". FIG. 5C shows how the watermarking is achieved. The number on the left side of each node represents the position in the randomly ordered list. The set of variables which are to be untouched by the transformations is the set of 1, 2, 4, 5, as shown in dotted lines. The set encodes "0110", i.e., "6" in the BCD code. Therefore, by comparing the initial and the final representation, one can establish the proof of the ownership of the design.

A signature may be embedded by providing such constraints that particular two nodes should remain in the same partition after partitioning is done. The following encoding scheme can be used. All the nodes in a design are randomly numbered. In the increasing order of node numbers, each node is considered for embedding a single bit. Each consecutive 7 pairs of nodes represent a character in the ASCII code. After all the nodes are considered, the process is repeated from the first node in the order. For each bit in the watermark, the terminal node is chosen such that the terminal node number represents the bit value. To embed 1, the terminal node should have odd number. To embed 0, the terminal node should have even number. The first feasible node in the increasing order of node numbers, starting from the position right after the terminal node of the last edge added, is selected as the terminal node to embed the bit value.

Referring to the exemplary graph illustrated in FIG. 6A, the balance requirement in this example is that one partition can have at most 20% more nodes than the other partition. Partitioning is a widely used design step which enables that smaller logical or physical partitions are efficiently synthesized using synthesis tools or places on multiple implementation platforms. The partitioned graph is illustrated in FIG. 6B. The design is embedded with a signature "A". FIG. 6C shows how the watermarking is achieved. The number in each node represents the position in the randomly ordered list. The pairs of nodes to remain in the same partition are (1,3), (2, 4), (3, 6), (4,8), (5,10), (6,12), and (7,13). The pairs are connected by dotted lines. The set encodes "1000001", i.e., "A" in the ASCII code.

In template mapping at the behavioral level, groups of primitive operations are replaced with more complex and specialized hardware units that are designed to implement common operations and are optimized for low area, power or delay. The template mapping step involves template matching, template selection, and clock selection. For this phase of behavioral synthesis, the author's signature is embedded by adding a set of design constraints such that some particular operations should be matched together. Using this set of constraints, the author's signature is encoded. For example, the following encoding scheme can be used: All the operations including functional delays in a design are randomly numbered. Any two operations i and j connected with an edge in the control data flow graph of the design can be constrained to match together, if the two operations belong to at least one of the templates available. The pair of operations is numbered by (i,j), where i<j. All such pairs are lexicographically sorted. In the lexicographically sorted list, if any two pairs (a,b) and (c,d) appear in this order in the list, either a<c or a=c&b<d must be true. That is, after lexicographical sorting, the templates are sorted in increasing order according to the number of operations which constitute the template. Each pair represents a binary number. For a pair (x,y), if x and y are both even numbers or both odd numbers, then the pair represents a "1", otherwise, the pair represents a "0". Suppose the BCD encoding for a decimal digit is used. For example, "97", i.e., "10010111" is to be embedded in the design. Then, using the lexicographically sorted list of the pairs, the corresponding pairs that represent the values are selected.

Figure 7A:
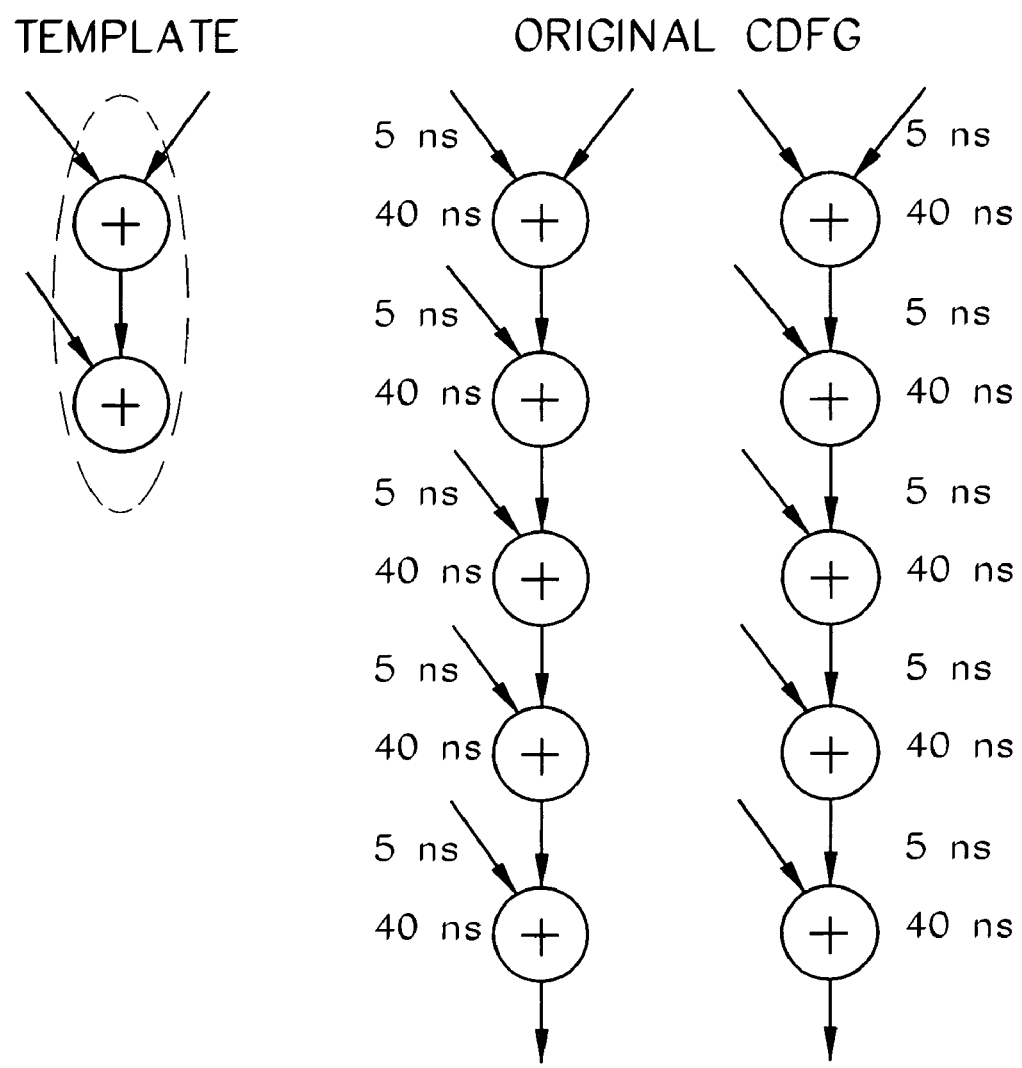
FIGS. 7A–C illustrate an example of watermarking template matching solutions.
Figure 7B:
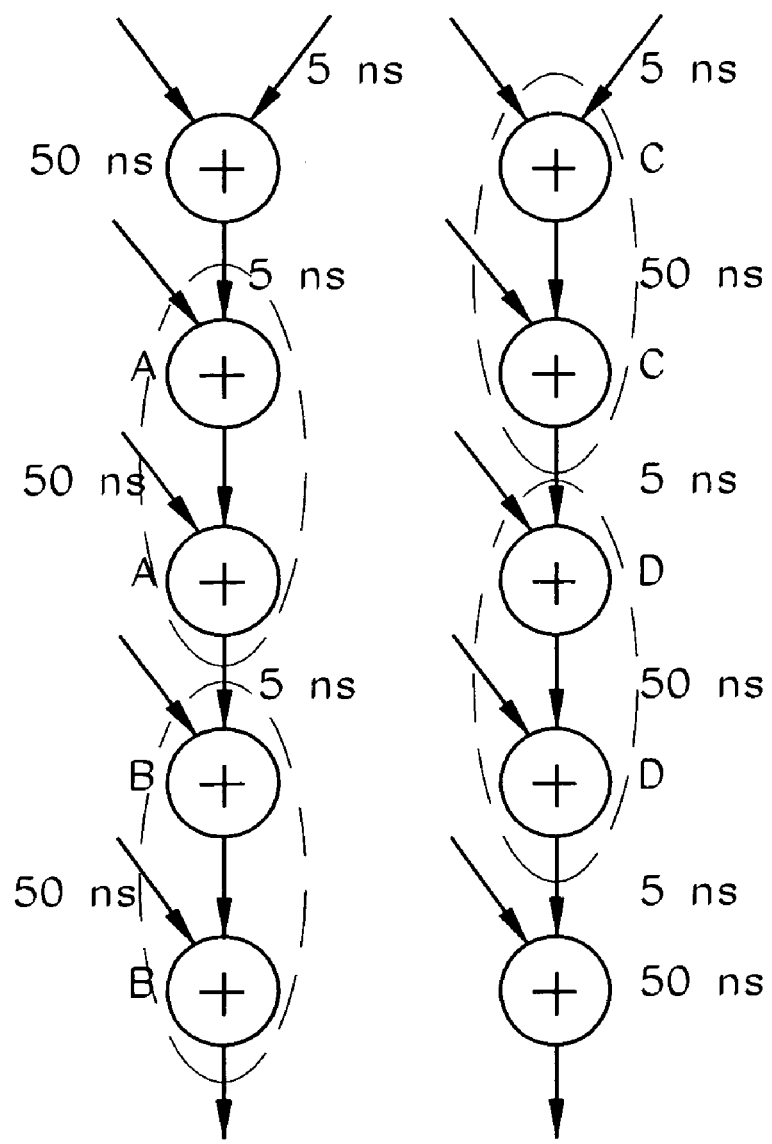
Figure 7C:
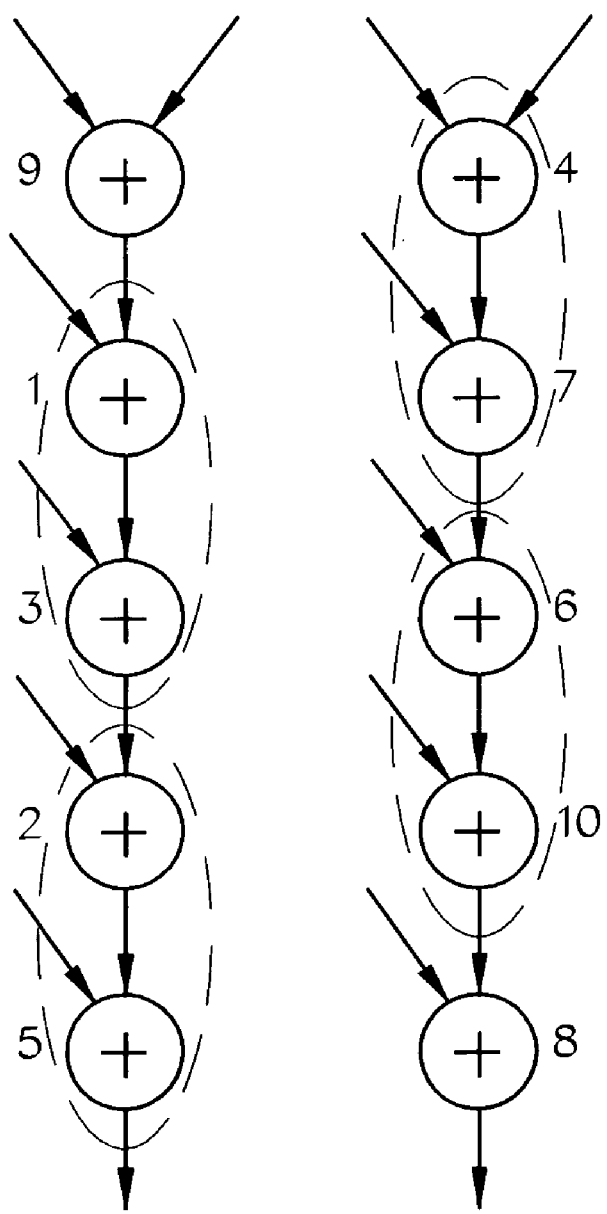

To illustrate the technique, consider a simple computational structure represented by a control data flow graph in FIG. 7A. Associated with each edge in the CDFG is a delay of 5 ns for accessing the register implied by the edge. Originally, each of the addition operations in the CDFG is implemented using primitive adder units. The optimal clock period for this implementation is 45 ns. For this clock period, the additions complete execution in one clock cycle (5 ns to access register operands plus 40 ns to execute). The template illustrated in FIG. 7A represents 3-input adder. A set of design constraints are imposed such that operations with the same label should be matched together. By replacing the primitive additions in the CDFG with the template, and by adjusting the clock period to 55 ns, the total execution delay is improved from 225 ns to 165 ns as illustrated in FIG. 7B, providing an optimal solution. In addition to the optimality, the design is embedded with a signature "9". FIG. 7C shows how the watermarking is achieved. Each pair in a set is such that, if both even numbers or both odd numbers, then the pair represents a "1", otherwise, the pair represents a "0". The set of additional design constraints is (1,3), (2,5), (4,7), (6,10) in the lexicographic order. The set encodes "1001", i.e., "9" in the BCD code.

In scheduling, the set of arithmetic and logical operations in the control data flow graph are partitioned into groups of operations so that the operations in the same group can be executed concurrently in one control step. The signature or watermark is embedded by adding a set of constraints such that two operations with no dependencies are forced or caused to be scheduled in one specific order, i.e., an additional edge is added in the transitive closure of the control data flow graph. A transitive closure of a graph G=(V,E) is a graph G'=(V,E'), where for every two nodes u and v in V, (u, v)∈E' if ∃ a path from the node u to the node v. Therefore, after transitive closure we have an edge between any two nodes which are connected by a path of directed edges in the original graph. Whenever an edge is added, the transitive closure of the control data flow graph is updated accordingly. In addition, the periods between a "as soon as possible control step" and a "as late as possible control step" that an operation can be scheduled to satisfy the timing constraints is overlapped in at least 2 control steps for the two operations. An "as soon as possible control step" for an operation is the earliest step in which the operation can be scheduled. Similarly, an "as late as possible control step" for an operation is the latest step in which the operation can be scheduled. Otherwise, adding an edge between the operations is not a new constraint. Whenever an edge is added, the periods for operations is updated accordingly. The control data flow graph with the extra edges should be able to satisfy the timing requirements with minimum hardware overhead.

Figure 8A:
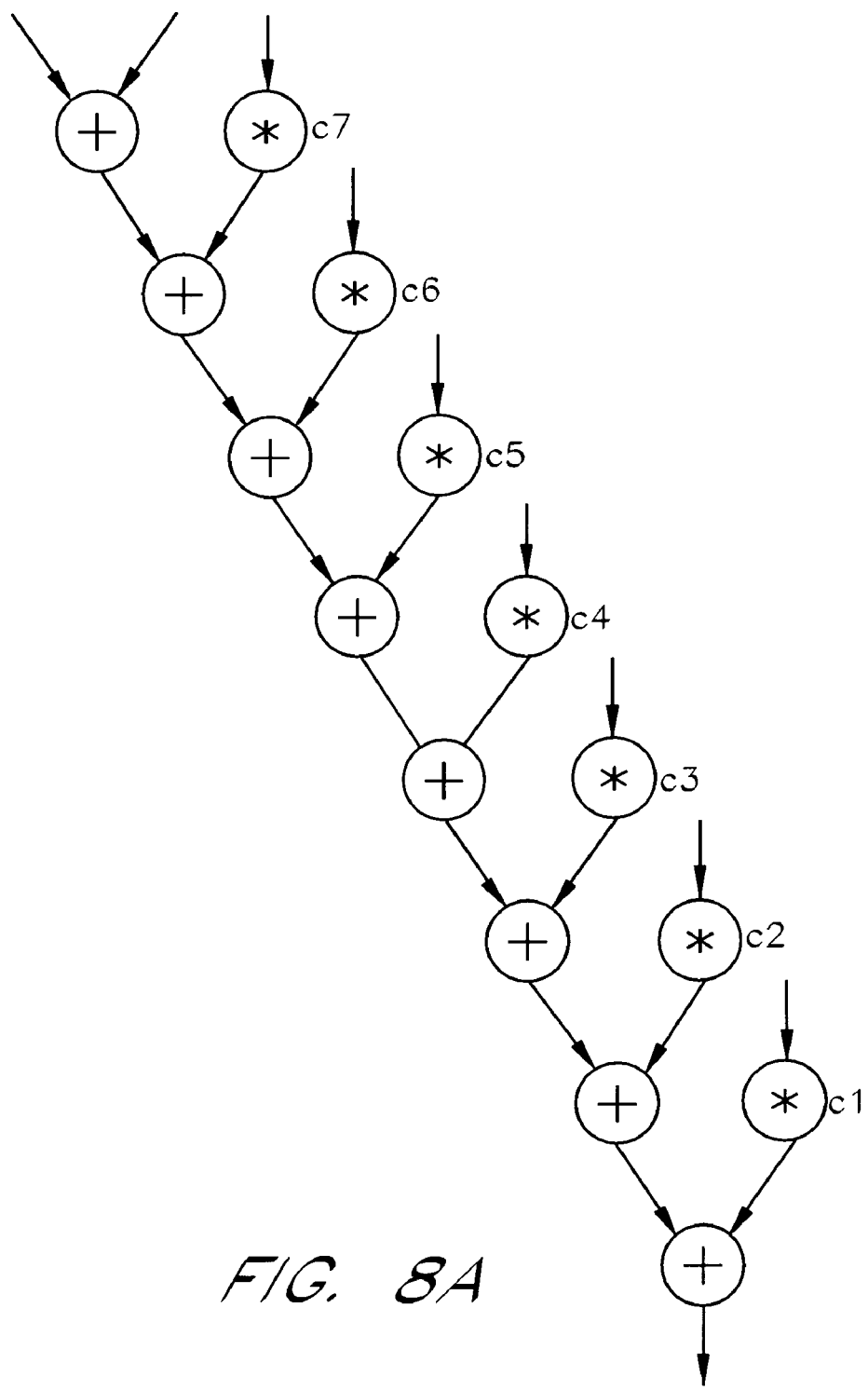
FIGS. 8A–C illustrate an example of watermarking scheduling solutions.
Figure 8B:
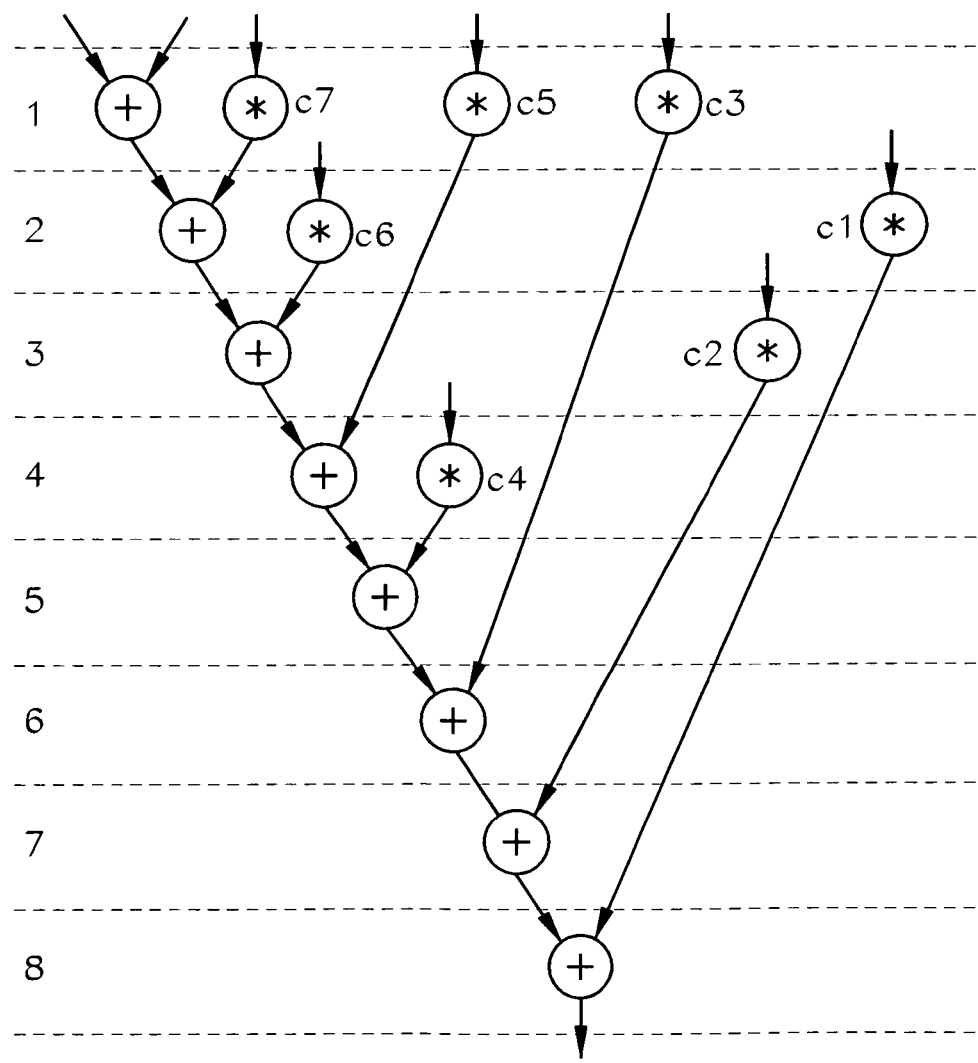
Figure 8C:
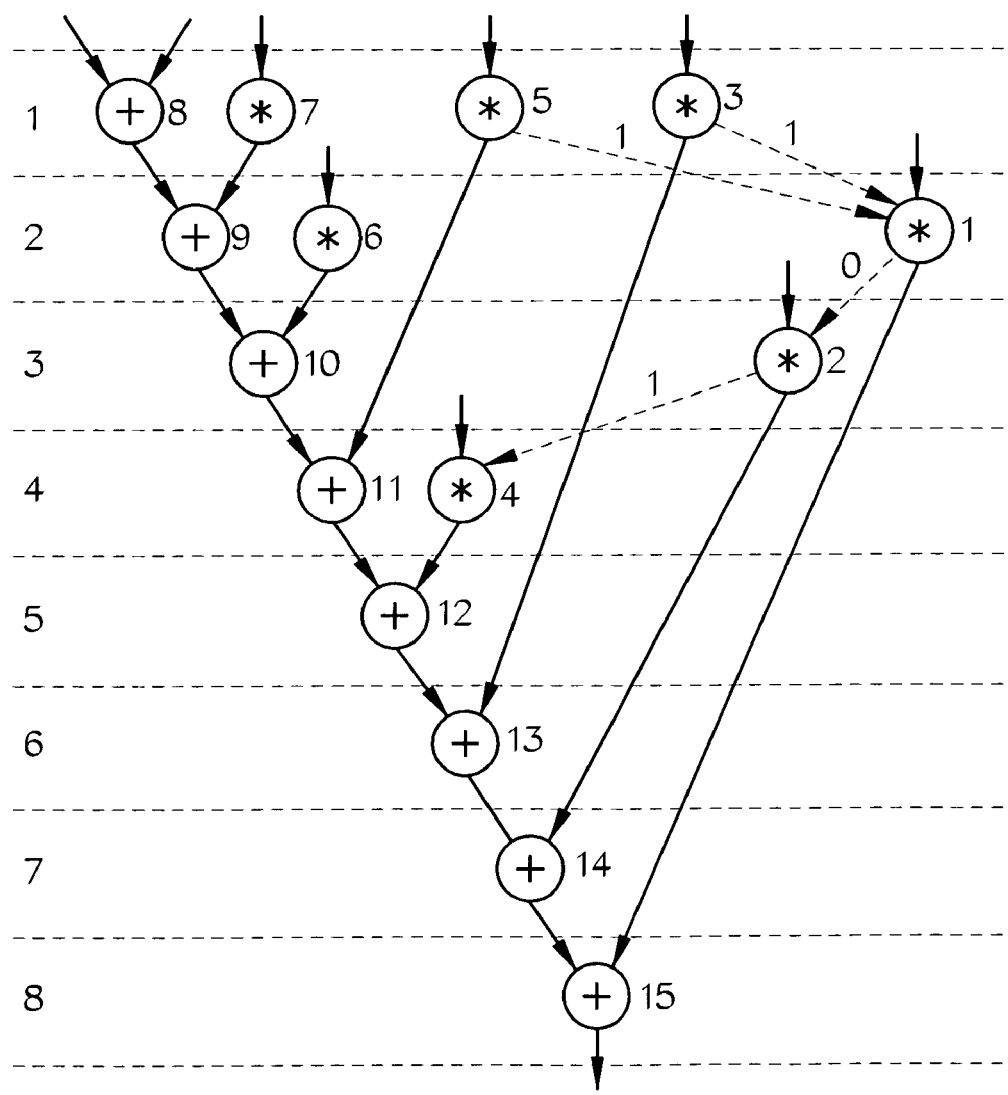

Using this set of additional constraints, a signature, such as that of the author's or other identifier, is encoded. For example, the following encoding scheme can be used: The operations in a design are sorted and numbered based on the degrees of their scheduling freedom in a decreasing order. The scheduling freedom of an operation is defined to be the length between the "as soon as possible control step" and the "as late as possible control step" that the operation can be scheduled to satisfy the timing constraints. An added edge represents a 1 if the begin and terminal nodes connected by the edge are either both even numbers or both odd numbers. Otherwise, the edge represents a 0. Following the order in this sorted list, for each operation, the first operation from the beginning of the list that an edge can be added to represent the desired value is located. Suppose, for example, that BCD encoding is used to represent a decimal digit. In this example, a "97" is to be embedded in the design. In the BCD code, a number "7" is encoded as "0111", while "9" is encoded as "1001". Thus, "97" is represented by the bit sequence "10010111". Then, using the sorted list, the corresponding edges which represent the values are added. Referring now to a computational structure represented by a control data flow graph in FIG. 8A, it is assumed that the illustrated operation is specified to be completed in 6 clock cycles. The corresponding scheduled control data flow graph is illustrated in FIG. 8B. The design is embedded with a signature "7". FIG. 8C shows how the watermarking is achieved. The number on the right side of each node represents the position in the sorted list. The set of additional edges is (1,2), (2,4), (3,1), (5,1), as shown in dotted lines. The set encodes "0111", which represents a "7" in the BCD code. The schedule now satisfies all the new imposed scheduling constraints which provide the proof of the ownership. Watermarking may also be performed during preprocessing of a system-level design.

The following scenario illustrates how successful watermarking tampering is substantially prevented. Alice has a design which is watermarked using the watermarking techniques described above. Bob purchases the design from Alice. There are at least three cases to consider, as discussed below.

Figure 9A:
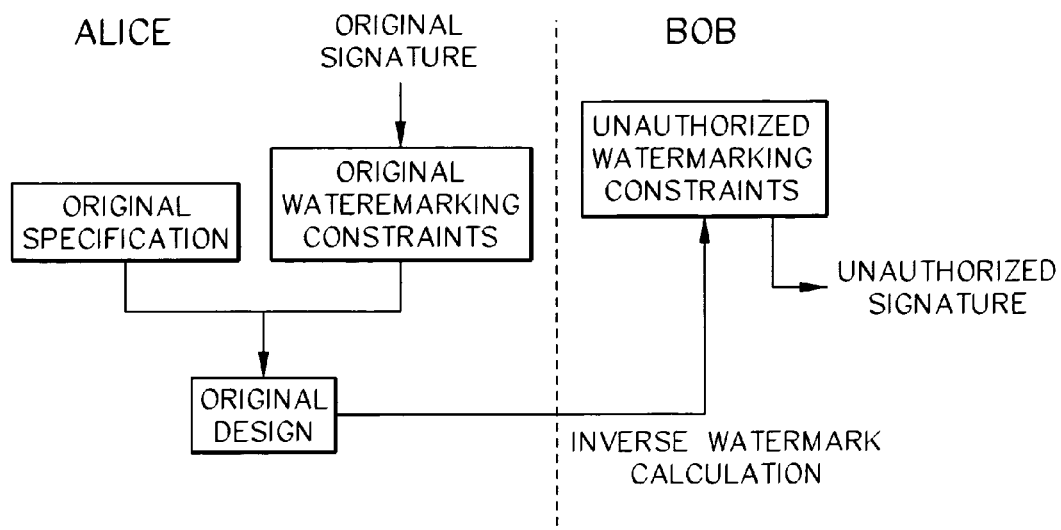
FIGS. 9A–C illustrate exemplary techniques which may be used in attempts to reduce a watermark's effectiveness.

Case 1: Bob analyzes the design and tries to find some artifact or "ghost signature" he can claim is his signature, as illustrated in FIG. 9a. That is, Bob may attempt to find a "signature" corresponding to a set of constraints with a favorable $P_c$, but which was discovered after the fact, rather than being intentionally added to the design as a watermark. Bob claims that the design is his because the design contains his, as well as Alice's, signatures. In this case, the longer and stronger signature will be a considered to be the real signature. Because it would be a very difficult task for an unauthorized user or claimant, such as Bob, to "find" any meaningful signature from the design, Alice's signature will be validated as the real signature. It is much easier to embed a signature in a preprocessing step. Therefore, Alice can protect her authorship by embedding one or more strong watermarks.

Figure 9B:
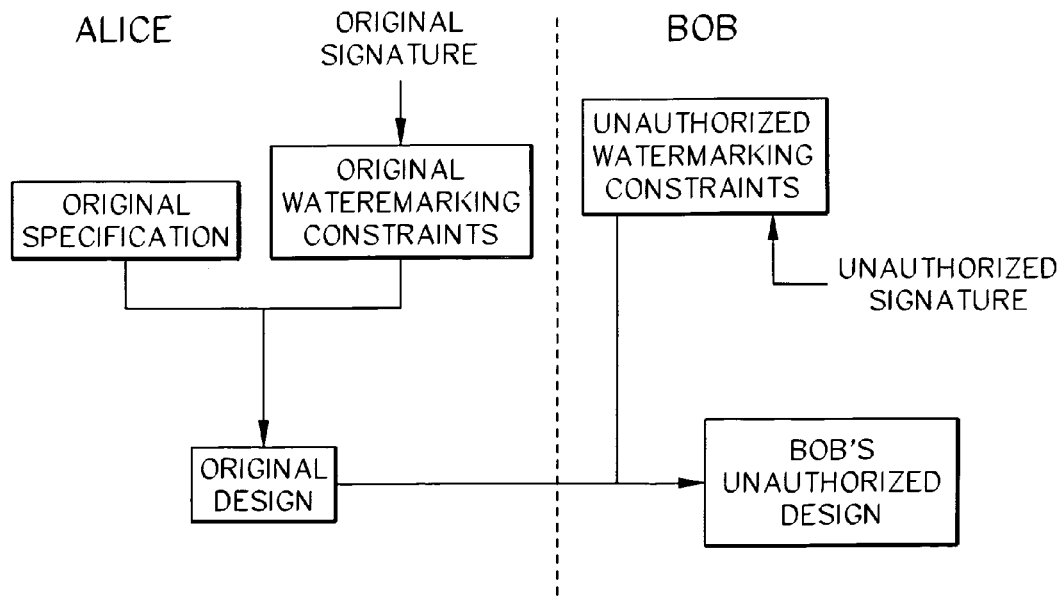

Case 2: Bob embeds or adds his signature in the design, as illustrated in FIG. 9B, and claims that the design is his. In this case, Alice can easily prove that the design belongs to her. Alice's version of the design has only her signature, but Bob's version of the design has both his and Alice's signatures, indicating Bob had merely added his signature to Alice's design. Therefore, Alice can prove that the design is hers.

Figure 9C:
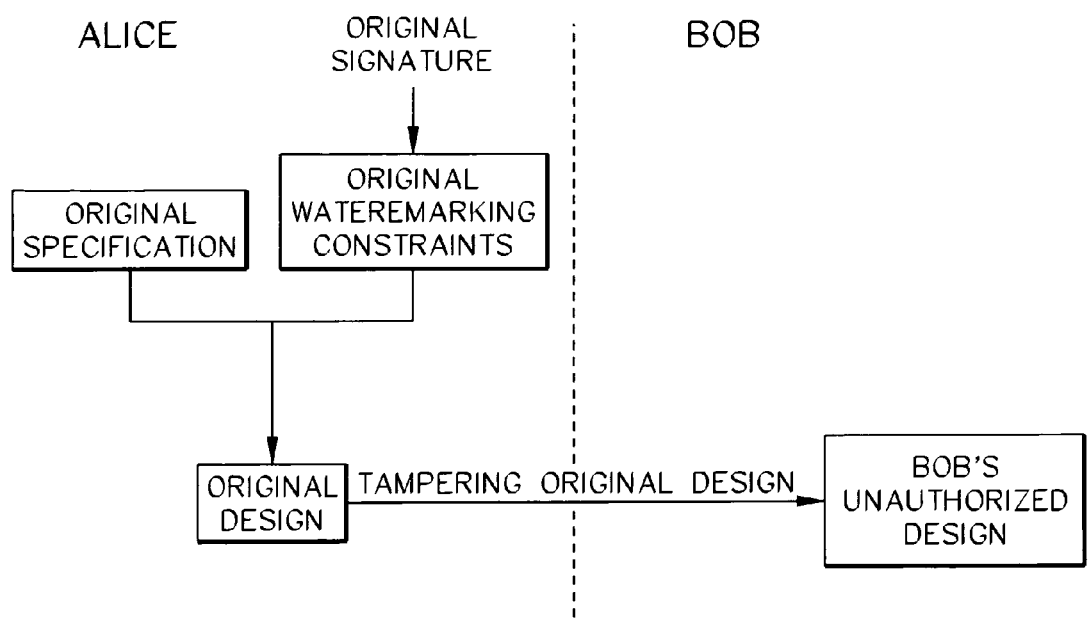

Case 3: In this case, Bob tries to tamper with Alice's signature by applying local changes, as illustrated in FIG. 9C. There are at least three reasons that discourage or prevent this kind of attack. First, these local changes can result in a worse or unacceptable design, with more hardware overhead while still being readable. Secondly, error correcting and detection codes allow the design to withstand a significant amount of attack. Thirdly, once Bob modifies the design, he has to perform all synthesis tasks below the affected part. For example, if the register-transfer level design is modified, then the logic synthesis and physical design needs to be performed, possibly making the final version of Bob's design completely different from the original in important ways.

For distributors of various types of intellectual property, such as hardware designs, software, documents, and images, it is important to prevent registered users from releasing unauthorized copies. Fingerprinting allows a distributor to detect any unauthorized copy and trace it back to the user by embedding data indicating the identity of the authorized recipient within corresponding distributed copies of the intellectual property. In one embodiment, the intellectual property uniquely marks and registers each copy of the corresponding intellectual property.

In one embodiment, this novel approach utilizes the addition of a set of additional constraints which encodes a fingerprint. This technique makes use of the property that a solution space contains numerous competitive solutions. Thus, a solution which encodes a fingerprint is selected from a set of similar quality solutions. An thief or attacker searching for the embedded fingerprint faces a difficult, if not an impossible task. However, generating such a solution, which satisfies the original specified constraints as well as additional fingerprinting constraints, can be efficiently accomplished by the circuit designer.

A general technique, enabling fingerprinting at all levels of the design process and applicable to an arbitrary optimization step, will now be described. In particular, the following fingerprinting problem will be discussed: How, in one embodiment, to generate a large number of high quality solution for a given optimization problem by solving the initial problem only once. In addition techniques for selecting a subset of k solutions from the pool of n solutions so that the solutions are sufficiently or maximally different will be discussed.

The discussion will be illustrated using an exemplary NP-complete problem-graph coloring(GC). The novel fingerprinting technique has been tested using a number of different standard benchmarks.

In one embodiment, fingerprinting techniques described below provide one or more of the following advantages. In at least one embodiment, the solver only needs to be run once, and thus, the run-time overhead for generating many solutions over that for one single solution is almost zero. Further, the number of solutions can be controlled and the solutions are distinct. In addition, the intellectual property provider's signature can be embedded in the fingerprinting process without additional watermarking techniques. Both symmetric and asymmetric fingerprints can be created by these methods. In symmetric fingerprinting both the seller and the buyer are protected from each other, while in asymmetric fingerprinting only one of them is protected. In addition, using the optional secure distribution methods described herein, the fingerprinting techniques may be highly secure against those recipients of the fingerprinted intellectual property seeking to collude to remove the fingerprint.

One embodiment of the fingerprinting procedure consists of two phases: the solution generation phase and the solution distribution phase.

Since, in one embodiment, each user or set of users will receive a unique copy, a solution space large enough to accommodate all users needs to be provided. Many difficult problems have a large number of solutions in nature. However, finding k different solutions can be at least as difficult as solving the original problem. Furthermore, after the solutions are found, a one-to-one mapping from the solution to the user who receives it needs to be maintained.

To solve the solution generation problem, a set of additional constraints is added to the initial problem such that many new solutions may be created from one solution to the modified problem. In fact, a subspace of the solution space is provided, where a base of this subspace can be built from this set of extra constraints, and the solution to the modified problem is a seed.

First, a set of solutions is generated from a given base, where each solution can be uniquely expressed as a combination of the base and the user's signature. Each user's signature can be mapped to a set of coefficients and the corresponding copy of solution can be assigned to the user. Hence, in one embodiment, only the base and the information for each user needs to be kept to identify the signature, rather than the entire modified version of the design.

In attempting to remove or alter a fingerprint, users may use a released solution to gain some information about the problem. They may also collect different copies with different fingerprints and try to produce new copies without the fingerprint. In one embodiment, the fingerprinting techniques prevent this or make it difficult. Furthermore, in one embodiment, the fingerprint allows the intellectual property owner to trace at least one of the authorized users making unauthorized copies by examining one of the unauthorized or forged copies.

Given a graph G(V,E) and an integer k, G is termed k-colorable if the vertices V can be colored such that adjacent vertices have different colors. The optimization graph (vertex) coloring problem is to find the minimum number k such that G is k-colorable.

Given one coloring scheme to a graph, if it is known that one vertex can also be colored by another alternative color, then there is already one more solutions to the same graph coloring problem. Furthermore, on knowing k vertices each has an second valid color, $2^k$ different solutions can be created with little overhead at almost no cost. These k vertices and their associate colors will serve as the base for the solution space.

Figure 10B:
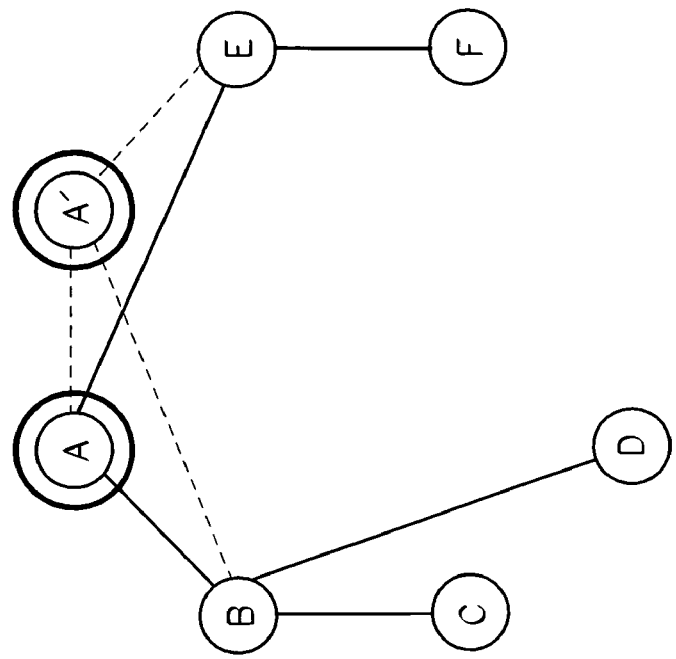
FIGS. 10A–B illustrate one embodiment of node duplication techniques used for generating various solutions.
Figure 10A:
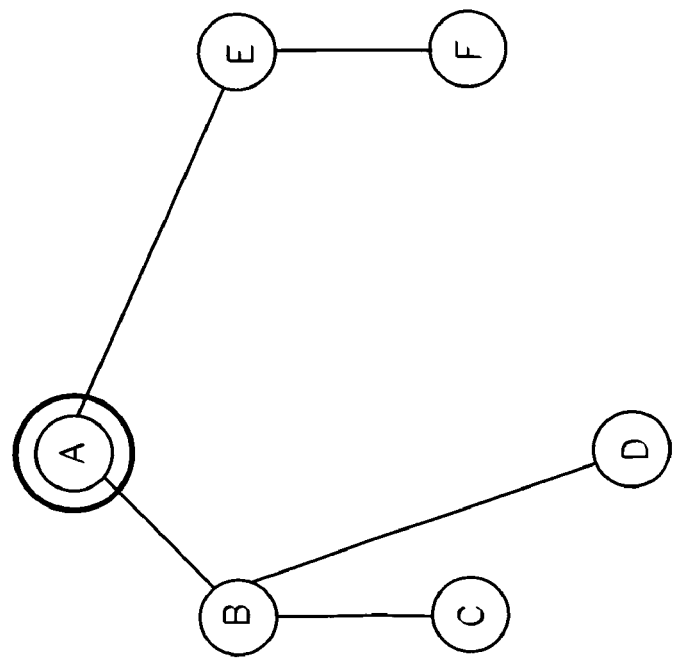

FIGS. 10A–B illustrate one technique used to create multiple different solutions for the same design with the same initial signature, thereby fingerprinting the designs. As illustrated a vertex is selected and then duplicated by creating a new vertex and connecting the new vertex to all the neighbor's of the selected vertex. Now the selected vertex can be labeled by either its color or the color of its duplication without violating the rules for graph coloring. To ensure these two vertices A, A' receive different colors, an edge is added between the vertices. In FIG. 10B, vertices A and A' are labeled by two different colors which can both be used to color A in the original graph 10A.

Figure 11B:
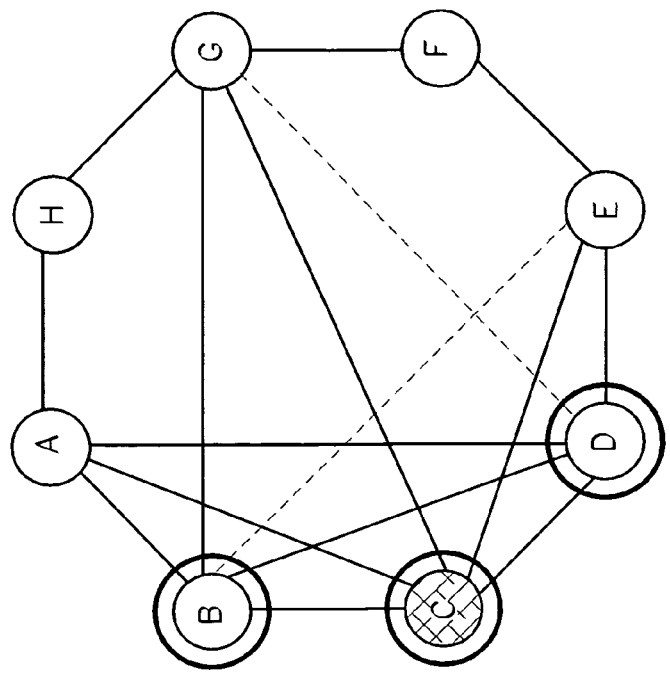
FIG. 11A–B illustrate the manipulation of a small clique.
Figure 11A:
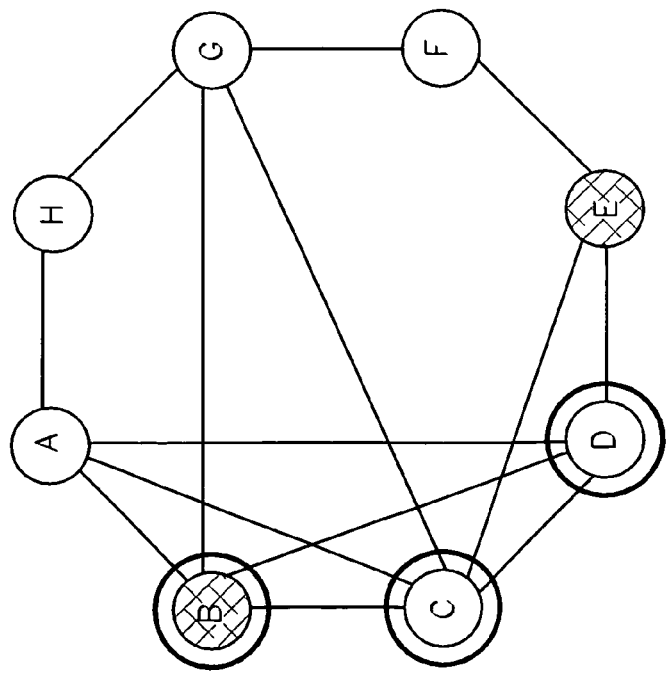

FIGS. 11A–B illustrate another technique used to create multiple different solutions for the same design with corresponding fingerprints. In valid color schemes, vertices from one clique will receive different colors, however, the solution may become invalid if they switch their colors. For example, referring to the triangle BCD illustrated in FIG. 11A, once the other five vertices' colors are fixed as shown, it can be seen, by analyzing potential solutions, that this is the only solution in this example.

As illustrated in FIG. 11B, extra or additional constraints can be added to this triangle, and now the three colors for vertices B, C, and D can be assigned arbitrarily. Nodes may represent variables, edges may represent assignment constraints, and colors may represent registers in the register allocation and assignment step. In general, for a clique of size k, if the neighbors of each vertex is connected to all other vertices in the clique, then based on one solution to the resulting graph, k! solutions to the original graph coloring problem are generated by assigning each of the k different colors to one of the vertices in the clique.

Furthermore, several cliques can be selected and combined together, forming a base for the solution space. In one embodiment, there is no constraint for two vertices that do not have an edge connecting them.

Figure 12B:
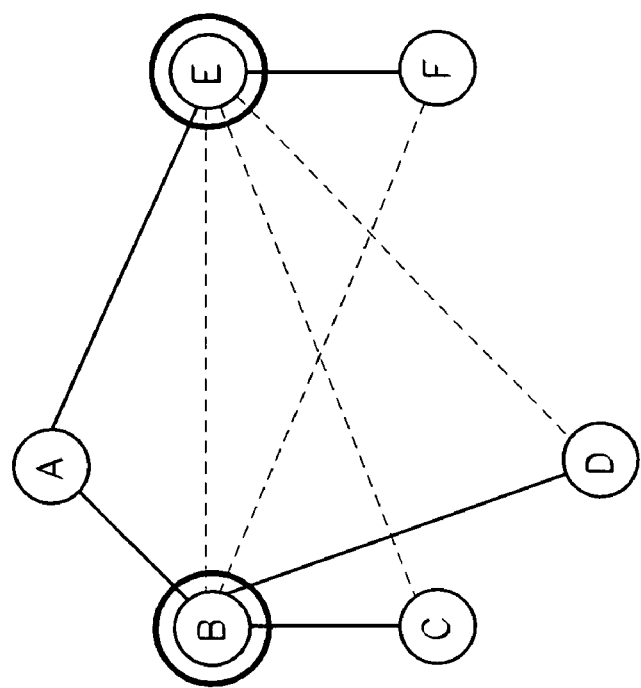
FIGS. 12A and 12B illustrate the construction of a bridge used to generate various solutions.
Figure 12A:
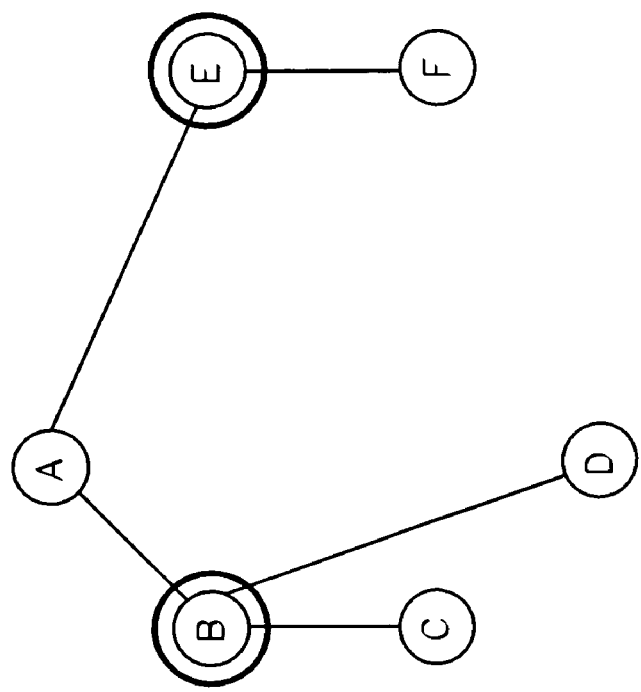

FIGS. 12A–B illustrate still another technique used to create multiple different solutions for the same design with corresponding fingerprint. A pair of unconnected vertices are selected. One of the vertex pairs is connected to all the neighbors of the other vertex in the pair, and the selected vertices are connected to each other. In FIG. 12B, vertices B and E, of the original graph illustrated in FIG. 12A, are selected, and when the new graph is colored, B and E will have different colors, for example, red and green. Now 4 solutions can be generated, where B and E are colored as (red, red), (red, green), (green, red) or (green, green).

This method is not restricted to a pair of unconnected vertices. For example, k unconnected vertices (an independent set of size k) can be selected, a complete graph can be created over these k vertices and each node can be connected to the neighbors of the others. In this way, $k^k$ different solutions can be derived from a single solution.

In another embodiment, post-processing may be performed on a given solution. Suppose, by way of example, there is a colored graph, G(V,E) by k colors, where $V_i$ is the subset of V that is colored by the $i^{th}$ color. So $V=\cup_{i=1}^{k}V_i$, and $V_i \cap V_j = \emptyset$ for all $i \neq j$. Then a color is selected and $V'=\cup_{j=1}^{1}V_{ij}$. The subgraph G[V'] of G is induced by V' is 1-colorable, that is, can be colored using one color. In general, the size of the subgraph is relatively small and therefore it is generally possible to find all the 1-color solutions to it. Similarly, another induced subgraph G[V'']

may be constructed such that $V' \cap V'' = \emptyset$, which can the be exhaustively recolored. If $n_1$ and $n_2$ solutions are identified for $G[V']$ and $G[V'']$ respectively, by applying the multiplication principle, $n_1 * n_2$ solutions can be created for the original graph $G(V,E)$.

As previously discussed, a distributor may want to give each user or each set of users a uniquely identified copy. However, this can be impractical for some mass produced products, such as electronic books, software or CD-ROMs. This problem can be solved by dividing the data that a user receives into two parts: public data, which is common to all users or to certain sets of users, and private data, which is unique to a particular user. Typically, the private part is small but can still contain enough information for the distributor to trace the user.

Furthermore, in one embodiment, unlike human fingerprinting, the embedded digital fingerprint may be changed while the object is kept useful or functionally correct. Two or more users may be able to easily detect the difference between their copies, and come up with another copy without their fingerprints. To protect against naive redistribution (i.e. where a user redistributes his or her copy of the object without altering it), a c-secure code is constructed that can trace at least one of the guilty users from a coalition with size up to c users. For other cases, c-secure codes with $\epsilon$-error is built which allows an innocent user comes under suspicion with probability $\epsilon$ but needs a code length polynomial to $\log(1/\epsilon)$ and $\log n$ (n is the number of potential users).

In another embodiment, to avoid computing the problem many times, different solutions may be created from one "seed." In such a situation, it may therefore be much easier for pirates to figure out the similarities and forge new valid solutions without their own fingerprints. This can be discouraged or prevented by using carefully designed distribution schemes. In one embodiment, copies can be released in such a way that a user involved in the forging process can be identified by examining a forged copy. The basic idea is, in one embodiment, to select a subset of the solution space generated by the "seed solution" and release only solutions from this subset instead of the entire solution space. In one embodiment, the subset is chosen so that any combination of solutions should not create a new solution in this subset, i.e., the innocent user will be protected because the innocent user's solution cannot be used to produce a new solution. From a solution created by a combination of solutions from this subset, at least one of the original solutions can be traced. Thus, from an illegal copy, at least one of the guilty users will be identified.

Changing node colors may have a domino affect on the graph coloring problem: changing the colors of a few vertices may render the entire solution. This domino affect discourages pirates. For example, even if the vertices selected for fingerprinting can be found (say in the clique manipulation or bridge construction techniques), the pirates will have difficult time to find the matching that indicates which clique the vertices belongs to and/or which vertices are connected to the found vertices by bridges.

The following is a summary of some of the ways in which the generic watermarking approach may be used or enhanced.

In one embodiment, the process of watermarking starts by analyzing the design complexity. The analysis is performed to determine the most suitable level or levels of design abstraction for embedding a signature. At least two approaches may be used for this step. The first approach is to embed the signature at the highest desirable or possible level of abstraction in order to protect all lower levels of a given design. The second approach is to select the level where the complexity of design is highest and therefore, most amenable to the addition of constraints. In addition, one can optionally decide to embed the signature only in some parts of design, while other design sections, which are more critical and sensitive to overhead, may be selectively avoided. For example, one can add a signature only to portions of the design which do not belong to a critical path, or to paths close or very close to the length of the critical path. Furthermore, the analysis may use previous experience about which type of constraint additions were most effective on similar designs.

The signature may be finite or essentially infinite. One way of generating an infinite or very long signature is by initializing the pseudo-random number generator using a shorter signature. The error correcting codes may be applied either before or after encryption. For example, Seed-Solomon codes or BCH codes may be used for this task. By using error correcting codes, resilience against attacks may be enhanced, as well as the uniqueness of the signature. The use of BCH codes may also better facilitate the copy detection process. In addition to already existing error-correction codes, new codes which high resilience against commonly practiced design changes may be developed.

There are several ways to additionally establish the connection between the author and the embedded signature. For example, one can relatively encode the signature in one design with respect to the signature in another design. In another embodiment, multiple independent or partially overlapping signatures are embedded into the design.

In some cases, the process of embedding watermark into a design can have a negative impact on the performance or cost characteristics of the design. In one embodiment, this impact may be reduced or eliminated by satisfying only a subset of watermarking constraints and alternations. In this situation, one may select constraints in such a way to achieve a good trade-off between the quality-of-design and the strength of the watermark.

Design watermarking can be performed either manually or by using a software program. When watermarking of a design is conducted using a software program, the program itself can be either integrated with existing synthesis tools or transparent to the tools. In the later case, only inputs to the synthesis tools are altered in such a way that the correctness of design is preserved while the watermark is embedded. In the former case, the synthesis tools themselves generate designs with watermarks.

During synthesis of a design, a signature may be added at some or all levels of the design process, including at behavioral, register-transfer, logic synthesis, and physical design levels. For example, during behavioral synthesis a watermark can be embedded during one or more of the following synthesis steps: resource allocation, transformations, partitioning, module selection, template matching, operation chaining, scheduling, assignment, and cycle time selection. In another embodiment, a watermark can be embedded during one or more of the following synthesis phases: state encoding and assignment, input encoding, output encoding, output polarity assignment, don't care assignment, multi-level combinational optimization, two-level combinational optimization, sequential optimization, retiming, retiming and logic transformations, partitioning, and cell-library binding.

In some situations, it may be most effective to embed a watermark during the physical design phase because the number of available components is higher at this level than at the higher levels of abstractions. For example, a watermark can be embedded during placement, partitioning, clock routing, global routing, and detail routing by imposing additional constraints during this design step.

Using the techniques described above, watermarks can be embedded or distributed into designs realized in any type of implementation platform, including field-programmable gate-arrays, programmable logic arrays, or other reconfigurable or fixed configuration platform, such at custom or standard cell designs.

In one embodiment, signatures are advantageously embedded into test or debugging hardware, such as JTAG or set-scan circuitry, because these types of hardware have very good controllability and observability using boundary scan or the like, and therefore facilitate copy detection. Furthermore, in another embodiment watermarks may be embedded in the testing sequences themselves.

In still another embodiment, a watermark can be detected using the relationship between particular pairs of a design's input and output signals. For example, if the transfer function of a digital signal processing or communication device is altered by embedding a signature, it is possible to observe the transfer function, and therefore the signature, by applying a unit impulse as the input. Another way to achieve this goal is to selectively assign don't care values in the specification of the design.

In one embodiment, a watermark can be embedded into any type of specification. For example, at the behavioral level a signature can be embedded into Java, C, C++, Verilog and VHDL code.

Copy detection can be accomplished using a variety of techniques. One approach is based on the statistical analysis of properties of a given design which is claimed to be a copy of or have similarity to the watermarked design. For example, information about the size of the design, the functionality of subparts of the design, and the topology of the design may be used to detect the signature. Another approach uses partial or complete matching of designs which are claimed to have similarity with the watermarked design. In some situations, copy detection may be accomplished using methods which observe the power consumption of the device. Depending on the structure and the functionality of the design, the power consumption time profile may indicate the presence of a particular signature. Thus, by comparing the power consumption of the suspected circuit to a reference or baseline power usage of a circuit which is known to incorporate the signature, the signature may be detected. In one embodiment, scale factors may be used to compensate for differences in implementation technologies in the suspected circuit and the reference circuit.

The basic method of watermarking can be used within more complex cryptographic or watermarking protocols. For example, a signature containing information about the date when the signature was embedded using time stamping cryptographic protocols can be added to a design. In another embodiment, a signature is embedded which can be interpreted if at least k out of n signature interpretation components are presented. The components may be distributed using one many standard secret sharing protocols. Yet another option is to embed signature which can be later revoked. This can be accomplished by using a revocable storage cryptographic protocol where the key to the embedded signature can be erased. In particular, zero knowledge proofs, a very useful cryptographic protocol, can be used in combination with watermarking. Using this well known cryptographic protocol, one may establish the proof of a particular signature presence within a design, without revealing the signature itself. Thus, in many situations, it is advantageous to combine one or more watermarking methods with one or more cryptography protocols. For example, zero knowledge proofs may be combined with secret sharing techniques to facilitate flexibility of how the proof of the authorship is provided.

The design watermark can be used for a variety of applications. For example, the presence of a watermark can be used for the authentication of programs and reconfigurable hardware configurations.

The above methods for embedding watermarks into designs or intellectual property is generic in a sense that it may be applied to a great variety of functional artifacts. Functional artifacts are object which have some functionality. For example, in addition to hardware designs, watermarks may be embedded into:

the functionality and/or structure of software programs, the functionality and the content of graphics and visualization software and end-products, the structure, the functionality, and the content of hypertext-pages, the structure and/or the content of multimedia presentation, the structure and/or the content of text, the structure and/or the functionality of computer architecture specifications, the structure and/or the functionality of synthetic drugs, the structure and/or the functionality of biotechnological compounds, the structure and/or the functionality of chemical compounds, the structure and/or the functionality of mechanical devices, and the structure and/or the content of database query results.

In particular, the methods described above can be used for embedding a watermark into a program so that the structure of the program is changed in such a way that it contains the signature and so that it is computationally difficult to further restructure. The watermark may be embedded using one or more of the following steps: algebraic transformations, Boolean transformations, redundancy manipulation transformations, control flow transformations, loop transformations, procedure optimization, register allocation, code scheduling, code assignment, low-level optimizations, interprocedural optimization, optimization for the memory hierarchy and interface code generation.

While certain preferred embodiments of the invention have been described, these embodiments have been presented by way of example only, and are not intended to limit the scope of the present invention.

What is claimed is:

1. A method for adding a digital watermark, including a signature, to a circuit design, comprising:
  receiving a first set of constraints used to specify a functional portion of the circuit design;
  receiving a second set of constraints used to specify said signature; and generating said circuit design based on at least said first set of constraints and said second set of constraints, wherein said watermark signature is embedded in said functional portion wherein said watermark is generated at least in part by preventing a first logic minimization occurrence.

2. The method as defined in claim 1, further comprising embedding information used to identify an intended recipient of said circuit design.

3. The method of adding a watermark as defined in claim 1, wherein said first set of constraints has a watermark embedded therein.

4. The method as defined in claim 1, wherein said embedding act includes selecting at least one node of said circuit design to embed at least a portion of said signature, wherein removal of said at least one node changes the functionality of said circuit design.

5. The method as defined in claim 1, further comprising encoding said signature to incorporate error correction terms such that said signature is recoverable after a portion of said signature has been altered.

6. The method as defined in claim 1, wherein said embedding act is performed so that the statistical possibility that a second design from a second source coincidentally has a structure that matches said signature is less than a first amount.

7. The method as defined in claim 1, wherein said circuit design is configured to be used in a programmable logic array.

* * * * *